(12) United States Patent
Huang et al.

(10) Patent No.: US 9,577,257 B2
(45) Date of Patent: Feb. 21, 2017

(54) METHODS OF MAKING LOW COST ELECTRODE ACTIVE MATERIALS FOR SECONDARY BATTERIES FROM ILMENITE

(71) Applicants: Guiqing Huang, Newton, MA (US); Boshan Mo, Newton, MA (US); Youde Mo, Newton, MA (US)

(72) Inventors: Guiqing Huang, Newton, MA (US); Boshan Mo, Newton, MA (US); Youde Mo, Newton, MA (US)

(*) Notice: Subject to any disclaimer, the term of this patent is extended or adjusted under 35 U.S.C. 154(b) by 287 days.

(21) Appl. No.: 14/485,016

(22) Filed: Sep. 12, 2014

(65) Prior Publication Data

US 2015/0076750 A1 Mar. 19, 2015

Related U.S. Application Data

(60) Provisional application No. 61/879,313, filed on Sep. 18, 2013.

(51) Int. Cl.
| | |
|---|---|
| H01M 4/485 | (2010.01) |
| C01B 25/00 | (2006.01) |
| C01G 23/00 | (2006.01) |
| H01M 4/58 | (2010.01) |
| H01M 10/052 | (2010.01) |
| C01G 49/00 | (2006.01) |
| C01G 49/14 | (2006.01) |
| C01C 3/12 | (2006.01) |
| C01B 25/37 | (2006.01) |
| C01B 25/45 | (2006.01) |

(52) U.S. Cl.
CPC ............ *H01M 4/485* (2013.01); *C01B 25/372* (2013.01); *C01B 25/375* (2013.01); *C01B 25/45* (2013.01); *C01C 3/12* (2013.01); *C01G 23/003* (2013.01); *C01G 23/005* (2013.01); *C01G 49/009* (2013.01); *C01G 49/14* (2013.01); *H01M 4/5825* (2013.01); *H01M 10/052* (2013.01); *Y02P 70/54* (2015.11)

(58) Field of Classification Search
CPC .. H01M 4/485; H01M 4/5825; H01M 10/052; C01B 25/372; C01B 25/375; C01B 25/45; C01C 3/12; C01G 23/003; C01G 23/005; C01G 49/009; C01G 49/14; Y02P 70/54; Y02E 60/122
USPC .......................................... 264/618; 252/500
See application file for complete search history.

(56) References Cited

U.S. PATENT DOCUMENTS

| | | | | |
|---|---|---|---|---|
| 4,919,772 | A * | 4/1990 | Bachot ...................... | C25B 1/00 204/252 |
| 2010/0028251 | A1* | 2/2010 | Roche ..................... | C01G 23/04 423/610 |
| 2011/0068295 | A1* | 3/2011 | Beck ...................... | C01B 25/375 252/182.1 |

(Continued)

*Primary Examiner* — Harold Pyon
*Assistant Examiner* — Danny N Kang

(57) ABSTRACT

A method of producing electrode active materials includes generating a source material of titanium (Ti) and a source material of iron (Fe) from an ilmenite, and performing a operation to the source material of Fe and the source material of Ti. The operation includes determining a content of Fe or Ti in the source material of Fe or Ti, preparing an intermediate mixture having the source material of Fe or Ti and other required source materials, ball-milling and drying the intermediate mixture, and sintering the intermediate mixture to form the electrode active materials.

19 Claims, 9 Drawing Sheets

(56) References Cited

U.S. PATENT DOCUMENTS

2011/0278495 A1\* 11/2011 Lamminmaki ........ B82Y 30/00
                                                        252/182.1
2012/0319034 A1\* 12/2012 Awano ................. C01G 23/005
                                                        252/182.1

\* cited by examiner

METHODS OF MAKING LOW COST ELECTRODE ACTIVE MATERIALS FOR SECONDARY BATTERIES FROM ILMENITE

CROSS-REFERENCE TO RELATED PATENT APPLICATION

This application claims priority to and the benefit of, pursuant to 35 U.S.C. §119(e), U.S. provisional patent application Ser. No. 61/879,313, filed Sep. 18, 2013, entitled "LOW COST ELECTRODE ACTIVE MATERIALS FROM ILMENITE FOR A SECONDARY ELECTROCHEMICAL BATTERY," by Guiqing Huang, Boshan Mo, Youde Mo, the disclosure of which is incorporated herein in their entirety by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

This invention relates generally to a method of producing electrode active materials, and more particularly to a method of producing low cost electrode active materials from ilmenite for secondary electrochemical batteries.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

In current power industry, cheap, long-lasting ways are required to store the excess energy produced by power plants. The energy can be stored in the form of intermittent power from renewable and cleaner energy sources, such as solar and wind farms. Unfortunately, the batteries available for grid-level storage are either too expensive or lack of thousands of cycles needed to make them cost-effective.

Lead-acid battery is one of the secondary batteries or rechargeable batteries. However, the lead-acid battery has the problems of, such as, significant negative impact on the environment, sulfation, low density and low cycle life.

Recent advances in battery development have promoted lithium iron phosphate (LFP) technology. With its high thermal stability, LFP is suitable for high-rate charge-discharge applications in both vehicles and power tools.

Another alternative battery option is the aqueous electrolyte battery such as aqueous sodium/potassium battery, which is environment friendly and can be fabricated in simple way. Aqueous system batteries have significantly higher rate than non-aqueous electrolyte system batteries due to the high conductivity of the aqueous system. Comparing with the non-aqueous electrolyte system, which requires a much more complicated design with high surface area current collectors, very thin roll-coated electrodes, and a large-area polymer separator, the aqueous electrolyte allows for use of much thicker electrode, much less expensive separator and current collector materials. Additionally, the aqueous system can be assembled in an open-air environment instead of a moisture-free fabrication environment which is required by non-aqueous system, resulting in a significantly low cost for producing the aqueous system. The advantages of using aqueous system lie in that compounds of abundant elements such as sodium compounds are used in electrode materials and electrolytes to replace the compounds of lithium. Further, water is used in electrolyte in the aqueous system to replace the expensive non-aqueous solvent. Sodium/potassium aqueous battery technology may be a prominent device to replace the lead-acid battery. The lower energy density of the aqueous battery is an acceptable trade-off for lower cost, longer cycle life, less hazardous battery chemistry and no significant negative impact to the environment because it contains no hazardous materials, no corrosive acids, no noxious fumes.

Therefore, a heretofore unaddressed need exists in the battery industry to provide simple and cost effective manufacturing process for producing electrode active materials.

SUMMARY OF THE INVENTION

In one aspect, the present invention relates to a method of producing electrode active materials. In certain embodiments, the method includes:

generating a source material of titanium (Ti) and a source material of iron (Fe) from an ilmenite;

performing a first operation to the source material of Fe, comprising:

determining a content of Fe in the source material of Fe;

preparing a first intermediate mixture comprising a source material of A, a source material of X, and the source material of Fe based on the determined content of Fe;

ball-milling and drying the first intermediate mixture; and sintering the first intermediate mixture to form at least one of the electrode active materials; and performing a second operation to the source material of Ti, comprising:

determining a content of Ti in the source material of Ti;

preparing a second intermediate mixture comprising a source material of A and the source material of Ti based on the determined content of Ti;

ball-milling and drying the second intermediate mixture; and sintering the second intermediate mixture to form at least one of the electrode active materials.

In certain embodiments, each of the electrode active materials is selected from $A_aFe_xM_{(1-x)}(XO_4)_c$, $A_aTi_b(XO_4)_c$, $A_aTi_bO_c$, $A_aM_bFe(CN)_6$ and $A_aTi_bP_2O_7$, where the a, b, and c are equal to or greater than 0, and the x is in the range of 0-1. It is to be understood that the A, M, X, a, b and c in each formula can be the same or different.

In certain embodiments, A is selected from lithium (Li), sodium (Na), potassium (K), silver (Ag), rubidium (Rb), caesium (Cs), strontium (Sr), barium (Ba), ammonium ($NH_4$), or a mixture thereof.

In certain embodiments, M is an element selected from Mg, aluminum (Al), silicon (Si), Ca, titanium (Ti), vanadium (V), chromium (Cr), manganese (Mn), iron (Fe), cobalt (Co), nickel (Ni), Cu, zinc (Zn), gallium (Ga), germanium (Ge), strontium (Sr), zirconium (Zr), niobium (Nb), molybdenum (Mo), tin (Sn), barium (Ba), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutelium (Lu), hafnium (Hf), tantalum (Ta), tungsten (W), cadmium (Cd), or a mixture thereof.

In certain embodiments, X is an element selected from phosphorus (P), Si, sulfur (S), Mo, W, or a mixture thereof.

In certain embodiments, each of the content of Fe in the source material of Fe and the content of Ti in the source material of Ti is determined by titration.

In certain embodiments, the performing a first operation to the source material of Fe further includes purifying the source material of Fe to remove impurities of sulfur and others.

In certain embodiments, the source material of A is selected from $Li_2CO_3$, LiOH, $Li_2O$, $Na_2CO_3$, NaOH, $Na_2O$, $K_2CO_3$, KOH, $K_2O$, $NH_4OH$, $NH_4HCO_3$, or a mixture thereof.

In certain embodiments, the first intermediate mixture further includes at least one source material selected from a source material of M, a source material of X, and a source material of carbon (C). In one embodiment, X is phosphorus, a molar ratio of A:Fe/M:P in the first intermediate mixture is 1-1.05:1:1, such that the electrode active composite material is $A_aFe_xM_{(1-x)}PO_4$.

In certain embodiments, the first intermediate mixture further includes at least one source material selected from a source material of M, a source material of X, and a source material of carbon (C). In one embodiment, X is S, a molar ratio of A:Fe:S in the first intermediate mixture is 2:2:3, such that the electrode active composite material is $Na_2Fe_2(SO_4)_3$.

In certain embodiments, the first intermediate mixture is ball-milled for 3-28 hours, and sintered at 350-900° C. for 5-24 hours.

In certain embodiments, the performing a second operation to the source material of Ti further includes purifying the source material of Ti to remove impurities.

In certain embodiments, the second intermediate mixture further includes at least one source material selected from a source material of X, and a source material of C.

In certain embodiments, in the $A_aTi_b(XO_4)_c$, a is 1, b is 2, c is 3, X is P, such that the electrode active material is $ATi_2(PO_4)_3$, a molar ratio of A:Ti:P in the second intermediate mixture is 1:2:3, and a weight percentage of the source material of C to a total weight of the second intermediate mixture is 0-15%.

In certain embodiments, in the $A_aTi_bO_c$, a is 4, b is 5, c is 12, such that the electrode active material is $A_4Ti_5O_{12}$, the second intermediate mixture further includes a source material of C, a molar ratio of A:Ti in the second intermediate mixture is 4:5, and a weight percentage of the source material of C to a total weight of the second intermediate mixture is 0-15%.

In certain embodiments, c is 14, such that the electrode active composite material is $A_aTi_bO_{14}$, the second intermediate mixture further includes a source material of Na, a source material of Li, and a source material of C, a molar ratio of Na:Li:Ti in the second intermediate mixture is 2:2:6, and a weight percentage of the source material of C to a total weight of the second intermediate mixture is 0-15%.

In certain embodiments, c is 7, such that the electrode active composite material is $A_aTi_bO_7$, the second intermediate mixture further includes a source material of Na, and a source material of C, a molar ratio of Na:Ti in the second intermediate mixture is 2:3, and a weight percentage of the source material of C to a total weight of the second intermediate mixture is 0-15%.

In certain embodiments, c is 7, such that the electrode active composite material is $A_aTi_bP_2O_7$, the second intermediate mixture further includes a source material of P, and a source material of C, a molar ratio of Ti:P in the second intermediate mixture is 1:2, and a weight percentage of the source material of C to a total weight of the second intermediate mixture is 0-15%.

In certain embodiments, the second intermediate mixture is ball-milled for 1-28 hours, and sintered at 350-900° C. for 0.5-15 hours.

In certain embodiments, the generating a source material of Ti and a source material of Fe from an ilmenite includes:
providing the ilmenite;
dissolving the ilmenite in sulfuric acid to form a first mixture;
reducing the first mixture using a reducing agent to form a second mixture;
filtering the second mixture to form a first filtrate and a first retained material;
crystallizing the first filtrate, and filtering to form a second filtrate and a second retained material, wherein the second retained material is the source material of Fe comprising $FeSO_4.7H_2O$ crystals;
hydrolyzing the second filtrate to form a third mixture;
filtering the third mixture to form a third filtrate and a third retained material, wherein the third retained material comprises the source of material of Ti; and
calcinating at least a portion of the third retained material to form titanium dioxide ($TiO_2$).

In certain embodiments, the second retained material is further purified by:
dissolving the crystals of $FeSO_4.7H_2O$ to form a solution; and
precipitating the impurities by adjusting the pH to 4.0-7.0, separating the insoluble precipitant, wherein the $FeSO_4.7H_2O$ solution is the source material of Fe.

In certain embodiments, the second retained material is further purified by:
recrystallizing the second retained material to form crystals of $FeSO_4.7H_2O$;
dissolving the crystals of $FeSO_4.7H_2O$ to form a solution; and
precipitating solution by a precipitant agent to form an insoluble precipitant, wherein the insoluble precipitant is the source material of Fe.

In certain embodiments, the precipitant agent is selected from phosphoric acid, phosphate, oxalic acid, oxalate, carbonic acid, carbonate, or a mixture thereof, and wherein the phosphate is selected from $NH_4H_2PO_4$, $(NH_4)_2HPO_4$, $NaH_2PO_4$, $Na_2HPO_4$, or a mixture thereof.

In certain embodiments, the insoluble precipitant is selected from $FePO_4$, $Fe_xM_{(1-x)}PO_4$, $NH_4FePO_4$, $NH_4Fe_xM_{(1-x)}PO_4$, $Fe_3(PO_4)_2$, $FeCO_3$, $FeC_2O_4$, $Fe(OH)_3$, $Fe(OH)_2$, or a mixture thereof.

In certain embodiments, the generating a source material of Ti and a source material of Fe from an ilmenite includes:
provide the ilmenite;
adding 80% potassium hydroxide (KOH) and air to the ilmenite to form a first mixture;
separating the first mixture to form a first liquid and a first solid material;
dissolving the first solid mixture in hydrogen chloride to form a second mixture;
separating the second mixture to form a second liquid and a second solid material;
extracting Fe from the second liquid to form the source material of Fe and a remnant material;
hydrolyzing the remnant material to form a third mixture;
filtering the third mixture to form a filtrate and a retained material, wherein the retained material comprises the source material of Ti; and
calcinating at least a portion of the retained material to form titanium dioxide ($TiO_2$).

In another aspect, the present invention relates to a method of producing at least one electrode active material, including:
generating a source material of Ti and a source material of Fe from an ilmenite; and
performing an operation to a source material of a base material, wherein the base material is Ti or Fe, wherein the operation comprises:
determining a content of the base material in the source material of the base material;
preparing an intermediate mixture comprising the source material of the base material based on the determined content of the base material;
ball-milling and drying the intermediate mixture; and
sintering the intermediate mixture to form the at least one electrode active material.

In certain embodiments, the at least one electrode active material is selected from $A_aFe_xM_{(1-x)}(XO_4)_c$, $A_aTi_b(XO_4)_c$, $A_aM_bFe(CN)_6$, or $A_aTi_bO_c$, a, b, and c are equal to or greater than 0, and x is in the range of 0-1.

In certain embodiments, A is an element selected from Li, Na, K, Ag, Rb, Cs, Cu, Mg, Ca, Sr, Ba, or $NH_4$, or a mixture thereof. In certain embodiments, M is an element selected from Mg, Al, Si, Ca, Ti, V, Cr, Mn, Fe, Co, Ni, Cu, Zn, Ga, Ge, Sr, Zr, Nb, Mo, Sn, La, Ce, Pr, Nd, Pm, Sm, Eu, Gd, Tb, Dy, Ho, Er, Tm, Yb, Lu, Hf, Ta, W, Cd, or a mixture thereof. In certain embodiments, X is an element selected from P, Si, S, Mo, W, or a mixture thereof.

In a further aspect, the present invention relates to electrode active materials synthesized according to the method as disclosed above.

In yet another aspect, the present invention relates to a device for accomplishing the above described method.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1A:
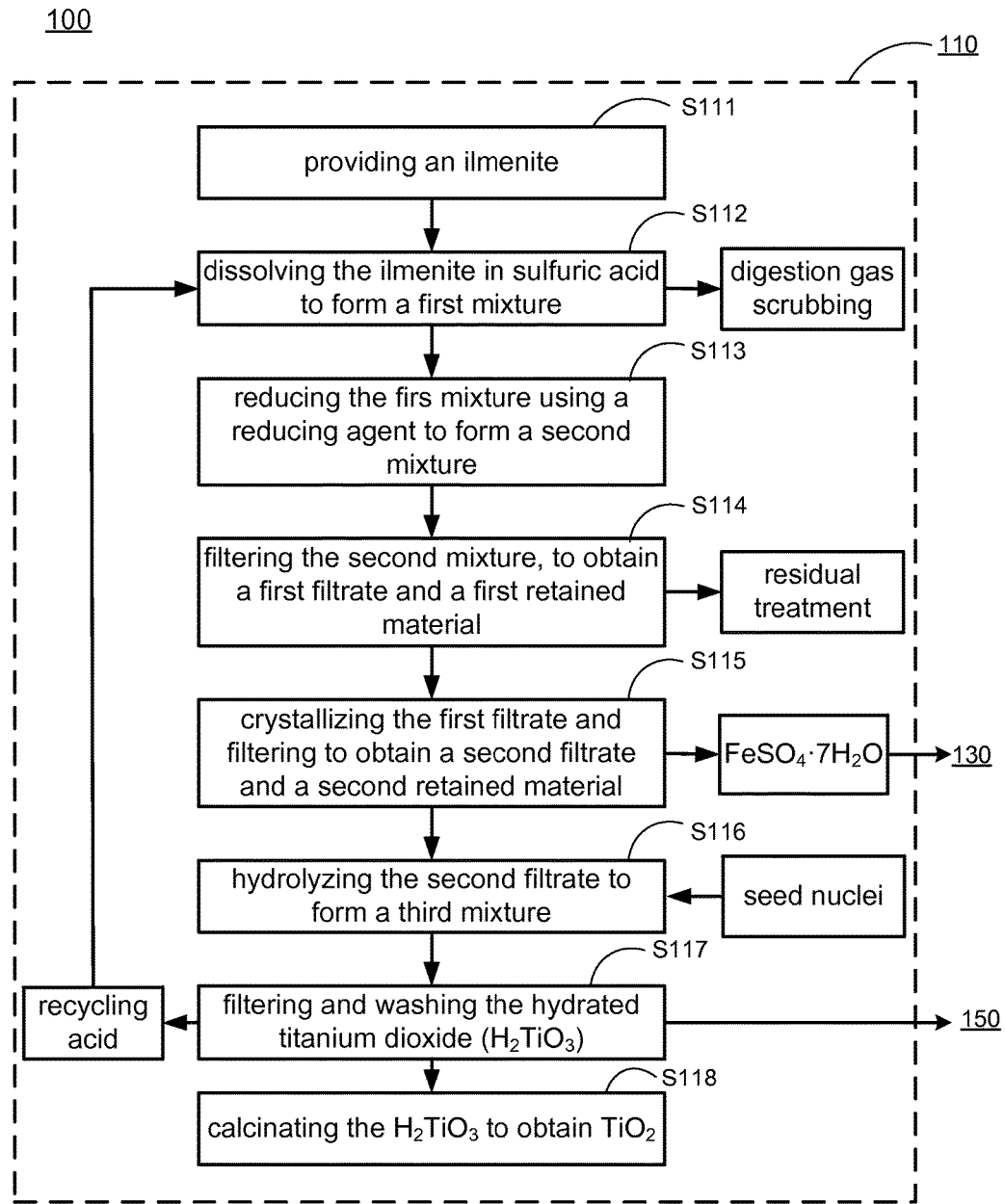
FIG. 1A shows a flowchart of a method of producing electrode active materials from ilmenite according to certain embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "scanning electron microscope" or "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, the term "X-ray diffraction" or "XRD" refers to a method of determining the arrangement of atoms within a crystal, in which a beam of X-rays strikes a crystal and diffracts into many specific directions. From the angles and intensities of these diffracted beams, a crystallographer can produce a three-dimensional picture of the density of electrons within the crystal. From this electron density, the mean positions of the atoms in the crystal can be determined, as well as their chemical bonds, their disorder and various other information.

As used herein, "reduction atmosphere", or "reducing atmosphere" is referred to an atmospheric condition in which oxidation is prevented by removal of oxygen and other oxidizing gases or vapors.

As used herein, the terms "comprising," "including," "having," "containing," "involving," and the like are to be understood to be open-ended, i.e., to mean including but not limited to.

OVERVIEW OF THE INVENTION

Ilmenite is mostly a crystalline iron titanium oxide (Fe-$TiO_3$). Most ilmenite is mined for titanium dioxide production. Ilmenite is converted into pigment grade titanium dioxide via either the sulfate process or the chloride process. The sulfate process employs simpler technology than the chloride route and can use lower grade, cheaper ores. For instance ilmenite with low-vanadium-content can only use sulfate process, as vanadium is a penalty element for pigment grade titanium dioxide. While producing pigment grade titanium dioxide, great effort, for example by washing, needs to take to remove any iron in hydrated titanium dioxide so the color of the final product is not spoiled.

When the mineral ilmenite is processed to produce titanium oxide, by-product/intermediate, such as a material containing iron (Fe) or titanium (Ti), is accompanied by the process. Aspects of the present invention comprehensively utilizes titanium and iron component in mineral ilmenite to produce electrode active materials $A_aFe_xM_{(1-x)}(XO4)_c$, $A_aTi_b(XO_4)_c$, $A_aTi_bO_c$, $A_aM_bFe(CN)_6$ and $A_aTi_bP_2O_7$, for example, $NaTi_2(PO_4)_3$, $LiTi_2(PO_4)_3$, $Li_4Ti_5O_{12}$, $Na_2Ti_3O_7$, $Li_2Na_2Ti_6O_{14}$, $K_aCu_bFe(CN)_6$, $Na_2Fe_2(SO_4)_3$, and $TiP_2O_7$ as electrode material for sodium/lithium/potassium aqueous battery, or lithium ion battery; $LiFePO_4$, $Li_4Ti_5O_{12}$, $LiFe_xV_{(1-x)}PO_4$, $LiFe_xTi_{(1-x)}PO_4$, and $LiFe_xMn_{(1-x)}PO_4$ as electrode materials for lithium ion battery.

In certain embodiments of the present invention, the electrode active materials include $A_aM_b(XO4)_c$ and $A_aM_bP_2O_7$. A in the formula is one or more elements or groups selected from Li, Na, K, Ag, Rb, Cs, Cu, Mg, Ca, Sr, Ba, or $NH_4$. In one embodiment, A is one or more element selected from Na, Li, Ag, K. In one embodiment, A is Na. M in the formula is one or more elements selected from Ti, Fe, Zn, Al, Sn, Zr, Ge, Hf, V, Nb, or Ta. In certain embodiments, M is one or more elements selected from Ti, Fe, and V. In one embodiment, M is Ti. X is one or more elements selected from P, Si, S, Mo, or W. In certain embodiments, X is one or more elements selected from P, Si, S, and V. In one embodiment, X is P. The coefficient a may be 0 or more, and 4 or less, the coefficient b is 0 or more, and the coefficient c is 0 or more.

In certain embodiments of the present invention, the electrode active materials include $A_aTi_bO_c$. A in the formula is one or more elements or groups selected from Li, Na, K, Cu, Ag, Mg, Ca, Sr, Ba, or $NH_4$. In one embodiment, A is one or more elements selected from Na, Li, and K. In one embodiment, A is Li and/or Na. The coefficient a is greater than 0, and 4 or less, the coefficient b is greater than 0, and the coefficient c is greater than 0.

In certain embodiments of the present invention, the electrode active materials include $A_aCu_bFe(CN)_6$. A in the formula is one or more elements or groups selected from Li, Na, K, $NH_4$, Cu, Ag, Mg, Ca, Sr, Ba, or a mixture thereof. In one embodiment, A is one or more elements selected from Na, $L_1$, $NH_4$ and K. In one embodiment, A is K. The coefficient a is greater than 0 and the coefficient b is greater than 0.

In certain embodiments of the present invention, the electrode active materials include formula $A_aFe_xM_{(1-x)}(XO_4)_c$. A in the formula is one or more elements or groups selected from Li, Na, K, Ag, Rb, Cs, Cu, Mg, Ca, Sr, Ba, or a mixture thereof. In one embodiment, A is one or more elements selected from Na, Li, Ag, K. In one embodiment, A is Li. In another embodiment, A is Na. M is one or more elements selected from Ti, Mn, Co, Ni, V, Mg, Sc, Cr, Mo, Zn, Cu, Al, Sn, Zr, Ga, Ge, Hf, V, Nb, Ta, W, La, Ce, Pr, Nd, Sm, Eu, Gd, Tb, Dy, Ho, Er, Tm, Yb, or Lu. In certain embodiments, M is one or more elements selected from Mn, Ni, Co, V, Ti, and Nb. In one embodiment, M is Mn. X is one or more elements selected from P, Si, S, Mo, or W. In certain embodiments, X is one or more elements selected from P, Si, S, or V. In one embodiment, X is P. In one embodiment, X is S. The coefficient a is greater than 0 or more, the coefficient c is greater than 0 or more, and the coefficient x is between 0 and 1.

In certain embodiments, the present invention relates to methods and processes focusing on inexpensive raw materials which contain the active component, specifically, comprehensively utilizing titanium, and iron component in mineral ilmenite to produce electrode active materials $A_aTi_bO_c$, $A_aM_b(XO4)_c$, $A_aM_bP_2O_7$, $A_aM_bFe(CN)_6$, and $A_aFe_xM_{(1-x)}(XO_4)_c$.

In one aspect, the present invention relates to a method of producing electrode active materials.

Figure 1B:
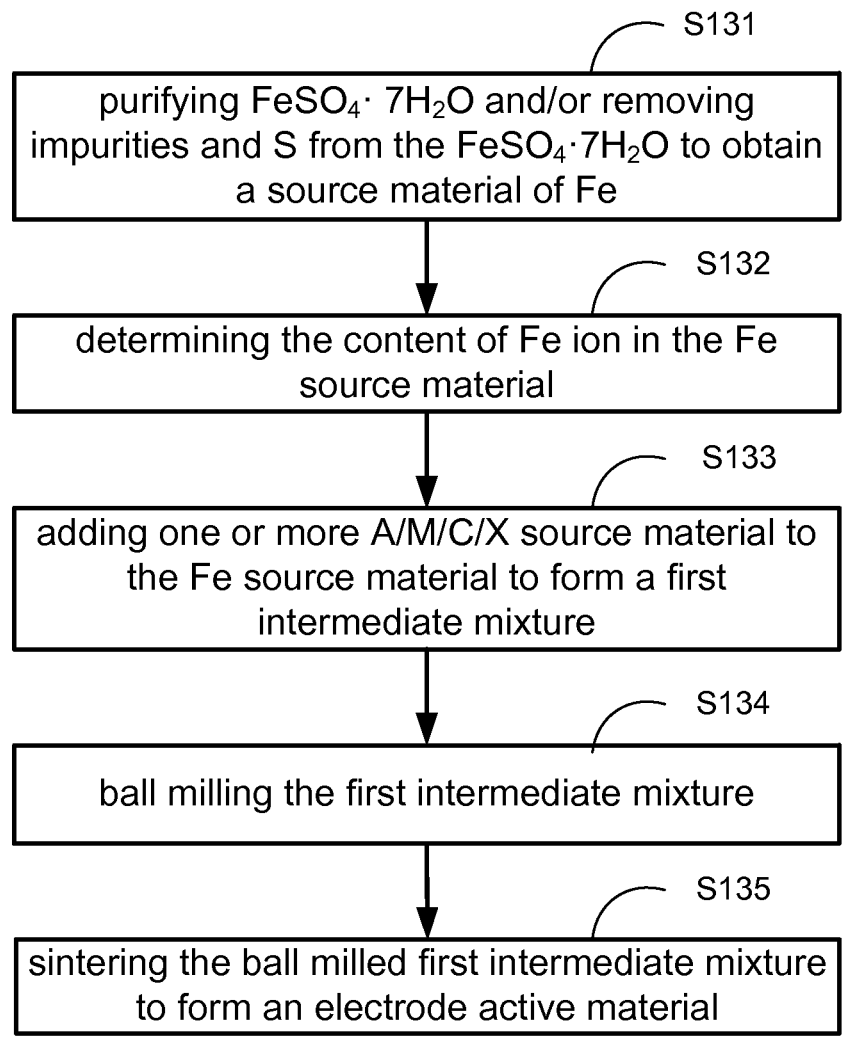
FIG. 1B shows a flowchart of a method of producing an electrode active material from source material of Fe of FIG. 1A according to certain embodiments of the present invention.
Figures 1C, 1D:
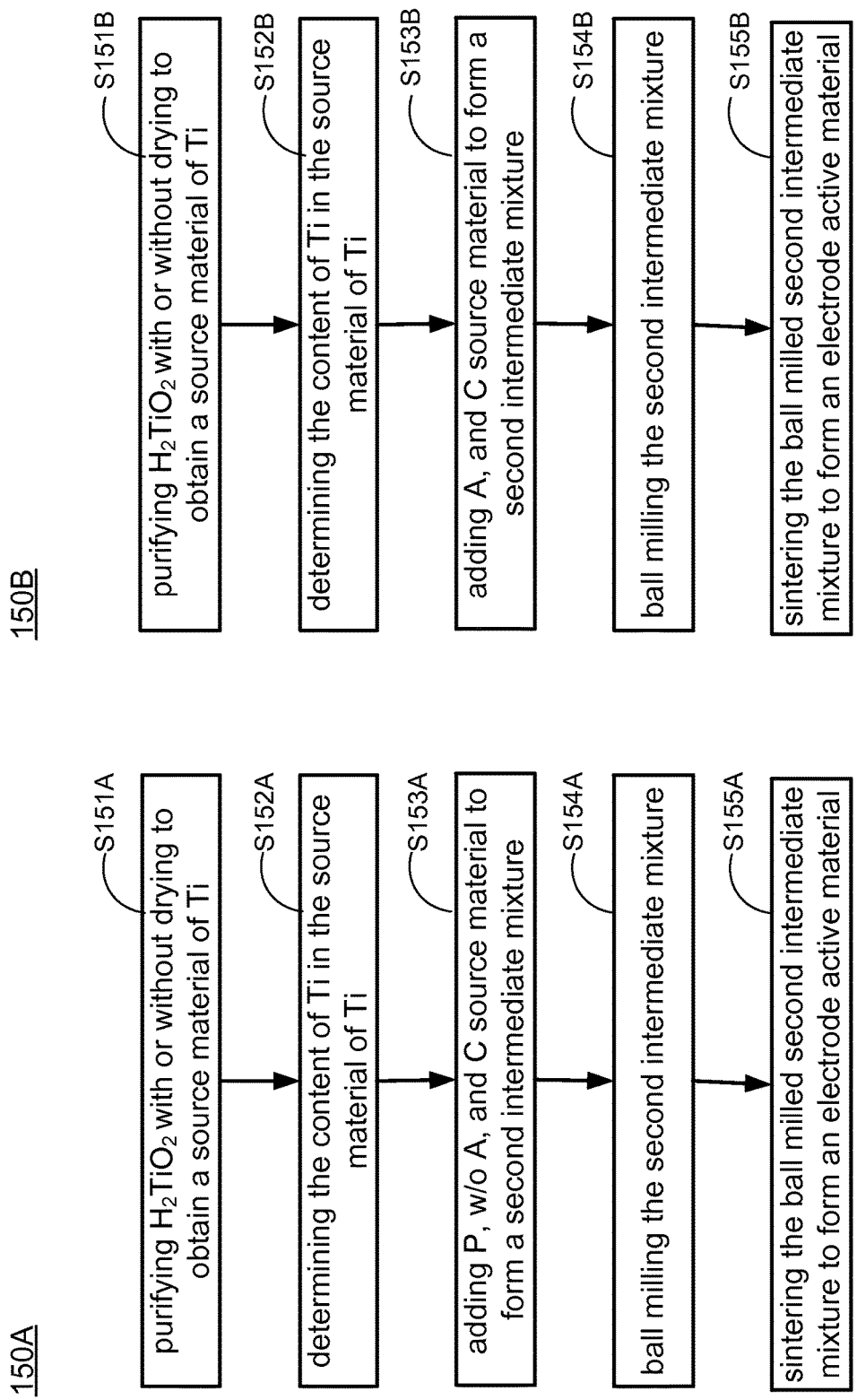
FIG. 1C shows a flowchart of a method of producing an electrode active material from source material of Ti of FIG. 1A according to certain embodiments of the present invention.
FIG. 1D shows a flowchart of a method of producing an electrode active material from source material of Ti of FIG. 1A according to certain embodiments of the present invention.

FIG. 1A shows a flowchart of a method of producing electrode active materials from ilmenite according to certain embodiments of the present invention. As shown in FIG. 1A, a systematic method 100 includes a main sulfate pathway 110, an iron pathway or a first operation 130, and a titanium pathway or a second operation 150. Referring to FIG. 1A, the main sulfate pathway 110 generate a source material of Fe and a source material of Ti from the ilmenite at steps S115 and S117 respectively. Then as shown in FIG. 1B, a first operation is performed to the source material of Fe to obtain at least one of the electrode active materials. Further, as shown in FIG. 1C and FIG. 1D, a second operation is performed to the source material of Ti to obtain at least one of the electrode active materials.

As shown in FIG. 1A, the main sulfate pathway 110 includes steps S110 to S118. In step S111, the mineral ilmenite is provided. The ilmenite includes certain amount of titanium-iron oxide. In step S112, the ilmenite is dissolved in sulfuric acid to form a first mixture. The sulfuric acid can be provided fresh or can be recycled sulfuric acid from the main sulfate pathway 110 during the following step S117. The sulfates may include, for example, $FeSO_4$ and $Fe_2(SO_4)_3$. The ilmenite is digested by the sulfuric acid. After digestion, the first mixture may mainly be formed of sulfates. Digestion gas may be generated during the digestion process, and the digestion gas normally needs to be scrubbed to prevent and decrease environment pollution. In step S113, the first mixture of sulfates is reduced using a reducing agent to form a second mixture. The reducing agent may be scrap iron, iron powder, or a reducing gas. In certain embodiments, the $Fe^{3+}$ in the mixture of sulfates, among other things, is almost completely reduced to $Fe^{2+}$. In step S114, the second mixture is then filtered to have a first filtrate passing thorough a first filter and a first retained material that is retained by the first filter. The first retained material is further treated by a residual treatment. In step S115, the first filtrate is crystallized to form $FeSO_4 \cdot 7H_2O$ crystals, and then filtered to have a second filtrate passing through a second filter and a second retained material that is retained by the second filter. The second retained material includes substantially the crystallized $FeSO_4 \cdot 7H_2O$, which can be directly used as inputs for the iron pathway 130 or the first operation 130. In step S116, the second filtrate is hydrolyzed to form a third mixture. In this step, nuclei seed or nuclei agent may be required for initiating the hydrolysis. In step S117, the hydrolyzed third mixture is optionally heated, and filtered to obtain a third filtrate and a third retained material. The third filtrate includes acid, and may be recycled and used in step S112. The third retained material includes metatitanic acid ($H_2TiO_3$). The third retained material containing $H_2TiO_3$ may be washed or/and dried one or more times to remove impurities. At least a portion of $H_2TiO_3$, which has been washed one or many times, can be used directly as the input of the titanium pathway or the second operation 150. In step S118, the washed $H_2TiO_3$ is ball-milled and calcinated to obtain titanium dioxide ($TiO_2$), which is known as titanium pigment or titanium white powder.

FIG. 1B shows a flowchart of a method of producing an electrode active material from source material of Fe of FIG. 1A according to certain embodiments of the present invention.

As shown in FIG. 1B, in step S131, the $FeSO_4 \cdot 7H_2O$ is optionally purified. In certain embodiments, the purification of the $FeSO_4 \cdot 7H_2O$ may include the step of adjusting re-dissolving $FeSO_4 \cdot 7H_2O$ solution's pH to 4.5 to 6.5 to precipitate out the impurities. In certain embodiments, the purification of the $FeSO_4 \cdot 7H_2O$ may include the step of re-crystallization. In certain embodiments, the purification of the $FeSO_4 \cdot 7H_2O$ may include removing the impurity substance of sulfur. In certain embodiments, the removing of the sulfur impurity includes dissolving the $FeSO_4 \cdot 7H_2O$ in a solution, oxidizing the $Fe^{2+}$ to $Fe^{3+}$ by such as $H_2O_2$, then precipitating the Fe ion by adding a precipitating agent to form an insoluble source material of Fe. The precipitating agent may be phosphoric acid or phosphate, such as $NH_4H_2PO_4$, $(NH_4)_2HPO_4$, $NaH_2PO_4$, $Na_2HPO_4$, oxalic acid or oxalate, or carbonic acid or carbonate. The insoluble source material of Fe thus formed may be $FePO_4$, $FeMPO_4$, $NH_4FePO_4$, $NH_4Fe_xM_{(1-x)}PO_4$, $Fe_3(PO_4)_2$, $FeCO_3$, $FeC_2O_4$, $Fe(OH)_3$, $Fe(OH)_2$. In step S132, the content of Fe ion in the purified material as described above is determined accurately, for example, by titration. The determined content of Fe in the source material of Fe may be used for calculating the ratio of Fe to the source materials of other elements. In step S133, at least one source material selected from a source material of A, a source material of M, a source material of C, and a source material of X is added to the insoluble source material of Fe to form a first intermediate mixture. In certain embodiments, the first intermediate mixture includes the source material of A, the source material of M and the source material of Fe, and the source material of P, the molar ratio of the source materials is A:Fe/M:P=1-1.05:1:1. In certain embodiments, the first intermediate mixture includes the source material of A, the source material of Fe, and the source material of S, the molar ratio of the source materials is A:Fe:S=2:2:3. In step S134, the first intermediate mixture is ball-milled. In certain embodiments, the mixing time of the ball milling may be about 1-72 hours. In one embodiment, the mixing time of the ball milling may be about 5-36 hours. In one embodiment, the mixing time of the ball milling may be about 13-18 hours. In step S136, the ball-milled material is then sintered to form an electrode active material. In certain embodiments, the sintering temperature may be about 150-1500° C. In one embodiment, sintering temperature may be about 250-1200° C. In one embodiment, sintering temperature may be about 350-900° C. In certain embodiments, the sintering time may be about 1-60 hours. In certain embodiments, the sintering time may be about 3-30 hours. In certain embodiments, the sintering time may be about 5-15 hours. In one embodiment, the sintering temperature may be about 350-900° C., and the sintering time may be about 5-15 hours. In certain embodiments, the sintering is performed without oxygen, or an inert environment.

In certain embodiments, A is an element or a group selected from Li, Na, K, Ag, Rb, Cs, Cu, Mg, Ca, Sr, Ba, $NH_4$, or a mixture thereof. In certain embodiments, A is Na, Li, Ag, K, or $NH_4$. In one embodiment, A is Li and/or Na.

In certain embodiments, M is an element selected from Mg, Al, Si, Ca, Ti, V, Cr, Mn, Co, Ni, Cu, Zn, Ga, Ge, Sr, Zr, Nb, Mo, Sn, La, Ce, Pr, Nd, Pm, Sm, Eu, Gd, Tb, Dy, Ho, Er, Tm, Yb, Lu, Hf, Ta, W, Cd, or a mixture thereof. In certain embodiments, M is Ti or V.

FIG. 1C shows a flowchart of a method of producing an electrode active material from the source material of Ti of FIG. 1A according to certain embodiments of the present invention.

As shown in FIG. 1C, the titanium pathway or the second operation 150A uses the hydrated titanium dioxide ($H_2TiO_3$) from step S117 of the main sulfate pathway 110 to produce electrode active materials. In step S151A, the $H_2TiO_3$ is optionally purified, and provided with or without drying. The impurity substance, such as Fe in the $H_2TiO_3$, is removed to obtain a source material of Ti. In step S152A, the content of Ti in the source material of Ti is determined accurately, for example, by titration. In one embodiment, the source material of Ti come from S117 in FIG. 1A, the source material is obtained after one wash without drying in S117, and the content of Ti in the source material of $TiO_2$ is 44.56% by weight, and the impurity Fe content in the source material of Ti is about 800 ppm. In step S153A, a source material of P (or Si, S, Mo, W), optionally a source material of C, and optionally a source material of A, are added to the source material of Ti to form a second intermediate mixture. In certain embodiments, the second intermediate mixture includes the source material of A, the source material of Ti, and the source material of P, and the molar ratio of the source materials in the second intermediate mixture is A:Ti:P=1:2:3. In step S154A, the second intermediate mixture is ball milled. In certain embodiments, the mixing time of the ball milling may be about 0.2-72 hours. In one embodiment, the mixing time of the ball milling may be about 0.5-36 hours. In one embodiment, the mixing time of the ball milling may be about 1-18 hours. In step S155A, the ball milled material is then sintered to form an electrode active material. In certain embodiments, the sintering temperature may be about 150-1500° C. In one embodiment, the sintering temperature may be about 250-1200° C. In one embodiments, the sintering temperature may be about 350-900° C. In certain embodiments, the sintering time is about 0.2-30 hours. In one embodiment, the sintering time is about 0.3-20 hours. In one embodiment, the sintering time is about 0.5-10 hours. In certain embodiments, the sintering temperature maybe about 350-900° C., and the sintering time is about 0.5-10 hours. In certain embodiments, the sintering is performed without oxygen, or an inert environment.

FIG. 1D shows a flowchart of a method of producing an electrode active material from the source material of Ti of FIG. 1A according to certain embodiments of the present invention.

As shown in FIG. 1D, the titanium pathway or the second operation 150B uses the hydrated titanium dioxide ($H_2TiO_3$) from step S117 of the main sulfate pathway 110 to produce electrode active materials. In step S151B, the $H_2TiO_3$ is optionally purified, and provided with or without drying. The impurity substance, such as Fe in the $H_2TiO_3$, is removed to obtain a source material of Ti. In step S152B, the content of Ti in the source material of Ti is determined accurately, for example, by titration. In step S153B, a source material of A and a source material of C are added to the source material of Ti to form a second intermediate mixture. In certain embodiments, the second intermediate mixture includes the source material of A, and the source material of Ti, and the molar ratio of the source materials in the second intermediate mixture is A:Ti=4:5. In certain embodiments, the second intermediate mixture includes the source material of A, and the source material of Ti, and the molar ratio of the source materials in the second intermediate mixture is A:Ti=2:3. In certain embodiments, the second intermediate mixture includes the source material of A, the source material of Ti, and the source material of C. The source material of A includes Na and Li, the molar ratio of the source materials in the second intermediate mixture is Na:Li:Ti=2:2:6, and the weight of the source material of C is about 0-15% of the second intermediate mixture. In step S154B, the second intermediate mixture is ball milled. In certain embodiments, the mixing time of the ball milling may be about 0.2-72 hours. In one embodiment, the mixing time of the ball milling may be about 0.5-36 hours. In one embodiment, the mixing time of the ball milling may be about 1-18 hours. In step S155B, the ball milled material is then sintered to form an electrode active material. In certain embodiments, the sintering temperature may be about 150-1500° C. In one embodiment, the sintering temperature may be about 250-1200° C. In one embodiments, the sintering temperature may be about 350-900° C. In certain embodiments, the sintering time is about 0.2-30 hours. In one embodiment, the sintering time is about 0.3-20 hours. In one embodiment, the sintering time is about 0.5-10 hours. In certain embodiments, the sintering temperature maybe about 350-900° C., and the sintering time is about 0.5-10 hours. In certain embodiments, the sintering is performed without oxygen, or an inert environment.

The electrode active materials produced according to the first operation or/and the second operation can be $A_aFe_xM_{(1-x)}(XO_4)_c$, $A_aTi_b(XO_4)_c$, $A_aTi_bO_c$, $A_aM_bFe(CN)_6$, or $A_aTi_bP_2O_7$. The a, b, and c are equal to or greater than zero, and the x equal to or greater than 0, and equal to or smaller than 1.

As described above, A is an element or group selected from Li, Na, K, Ag, Rb, Cs, Cu, Mg, Ca, Sr, Ba, $NH_4$, or a mixture thereof. In certain embodiments, A is selected from Li, Na, Ag, $NH_4$, or K. In one embodiment, A is selected from Li or/and Na. As described above, M is an element selected from Mg, Al, Si, Ca, Ti, V, Cr, Mn, Co, Ni, Cu, Zn, Ga, Ge, Sr, Zr, Nb, Mo, Sn, La, Ce, Pr, Nd, Pm, Sm, Eu, Gd, Tb, Dy, Ho, Er, Tm, Yb, Lu, Hf, Ta, W, Cd, and a mixture thereof. As described above, X is an element selected from P, Si, sulfur (5), Mo, W, and a mixture thereof.

In certain embodiments, each of the content of Fe in the source material of Fe and the content of Ti in the source material of Ti is determined by titration. The accurate determination of the content of Fe or Ti in the source material of Fe and the source material of Ti can be used for preparing the first and second intermediate mixture, such that a specific molar ratio of the source materials is mixed according to the determined contents or contents of Fe and Ti in the source material of Fe and the source material of Ti.

In certain embodiments, the performing a first operation to the source material of Fe further includes purifying the source material of Fe to remove impurities of sulfur.

In certain embodiments, the source material of A is selected from $Li_2CO_3$, $LiOH$, $Li_2O$, $Na_2CO_3$, $NaOH$, $Na_2O$, $K_2CO_3$, $KOH$, $K_2O$, $NH_4OH$, $NH_4HCO_3$, or a mixture thereof.

In certain embodiments, the first intermediate mixture further includes at least one source material selected from a source material of M, and a source material of X. In one embodiment, X is P, a molar ratio of A:Fe/M:P in the first intermediate mixture is 1-1.05:1:1, and a weight percentage of the source material of C to a total weight of the second intermediate mixture is 3-15%.

In certain embodiments, the first intermediate mixture is ball-milled for 3-28 hours, and sintered at 350-900° C. for 5-15 hours.

In certain embodiments, the performing a first operation to the source material of Fe includes purifying $FeSO_4.7H_2O$ as the further source material of $K_3Fe(CN)_6$.

In certain embodiments, the source material of A is selected from $Li_2CO_3$, LiOH, $Li_2O$, $Na_2CO_3$, NaOH, $Na_2O$, $K_2CO_3$, KOH, $K_2O$, $NH_4OH$, $NH_4HCO_3$, or a mixture thereof.

In certain embodiments, the first intermediate mixture further includes at least one source material selected from a source material of M, and a source material of Fe. In one embodiment, a molar ratio of A:M:Fe in the first intermediate mixture is 1:1:1.

In certain embodiments, the performing a second operation to the source material of Ti further includes purifying the source material of Ti to remove impurities. In one embodiment, one of the main impurity is Fe.

In certain embodiments, the second intermediate mixture further includes at least one source material selected from a source material of X, and a source material of C. In certain embodiments, a is 1, b is 2, c is 3, X is P, such that the electrode active material is $ATi_2(PO_4)_3$, a molar ratio of A:Ti:P in the second intermediate mixture is 1:2:3, and a weight percentage of the source material of C to a total weight of the second intermediate mixture is 0-15%.

In certain embodiments, a is 4, b is 5, c is 12, such that the electrode active material is $A_4Ti_5O_{12}$, the second intermediate mixture further includes a source material of C, a molar ratio of A:Ti in the second intermediate mixture is 4:5, and a weight percentage of the source material of C to a total weight of the second intermediate mixture is 0-15%.

In certain embodiments, c in the $A_aTi_bO_c$ is 14, such that the electrode active composite material is $A_aTi_bO_{14}$, the second intermediate mixture further includes a source material of Na, a source material of Li, and a source material of C, a molar ratio of Na:Li:Ti in the second intermediate mixture is 2:2:6, and a weight percentage of the source material of C to a total weight of the second intermediate mixture is 0-15%.

In certain embodiments, the second intermediate mixture is ball-milled for 1-18 hours, and sintered at 350-900° C. for 0.5-10 hours.

In certain embodiments, the second retained material as shown in S115 of FIG. 1A, which contains Fe, is further purified by adjusting $FeSO_4.7H_2O$ solution pH between 4.5 to 6.5 to precipitate out impurities, or by recrystallizing the second retained material to form crystals of $FeSO_4.7H_2O$, dissolving the crystals of $FeSO_4.7H_2O$ to form a solution, and precipitating the solution by a precipitant agent to form an insoluble precipitant, wherein the insoluble precipitant is the source material of Fe. In certain embodiments, the precipitant agent is selected from at least one of phosphoric acid, phosphate, oxalic acid, oxalate, carbonic acid, carbonate, and a mixture thereof. In one embodiment, the phosphate is selected from $NH_4H_2PO_4$, $(NH_4)_2HPO_4$, $NaH_2PO_4$, or $Na_2HPO_4$. In certain embodiments, the formed insoluble precipitant formed is selected from $FePO_4$, $FeMPO_4$, $NH_4FePO_4$, $NH_4Fe_xM_{(1-x)}PO_4$, $Fe_3(PO_4)_2$, $FeCO_3$, $FeC_2O_4$, $Fe(OH)_3$, $Fe(OH)_2$, or a mixture thereof.

Figure 2A:
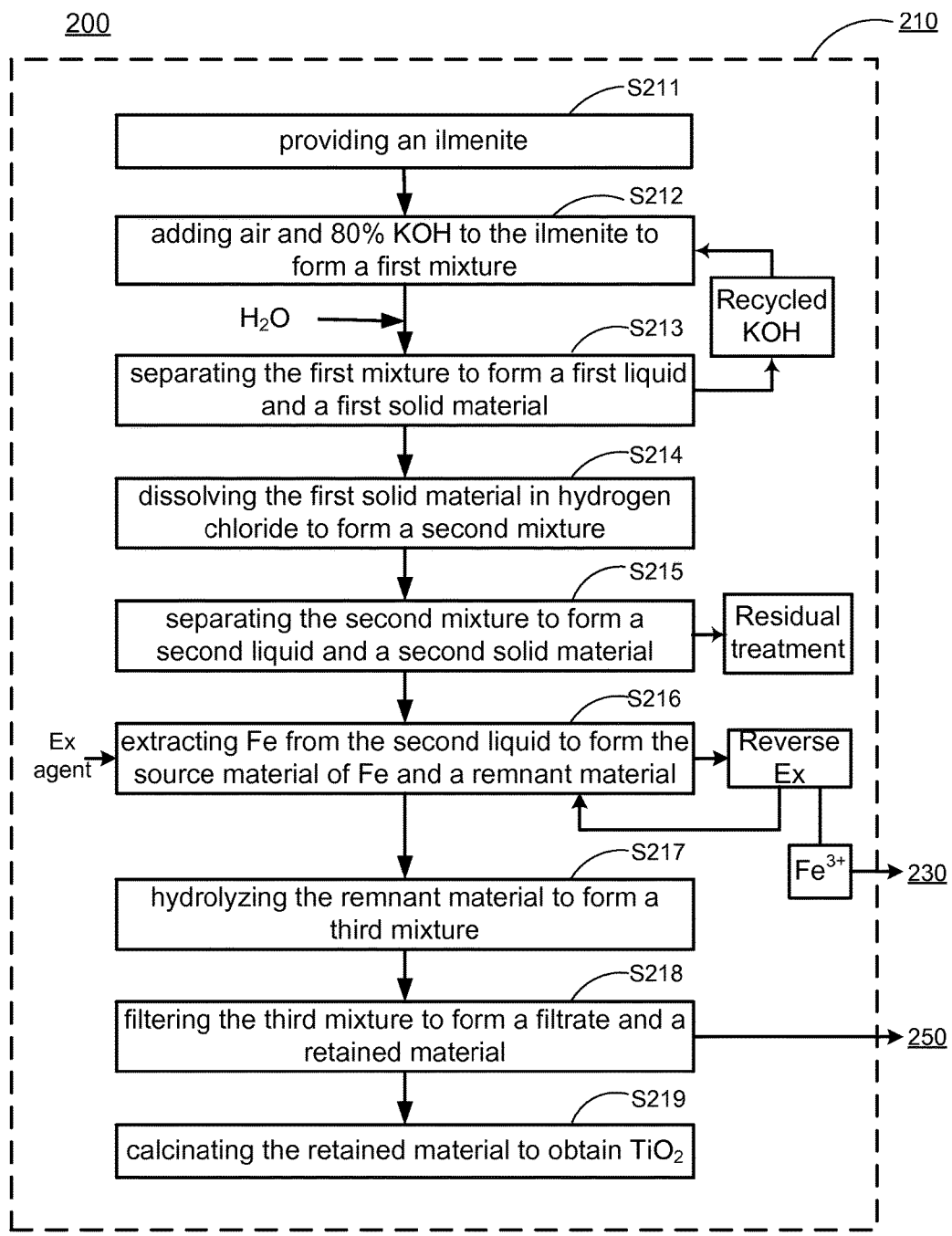
FIG. 2A shows a flowchart of a method of producing electrode active materials from ilmenite according to certain embodiments of the present invention.
Figure 2B:
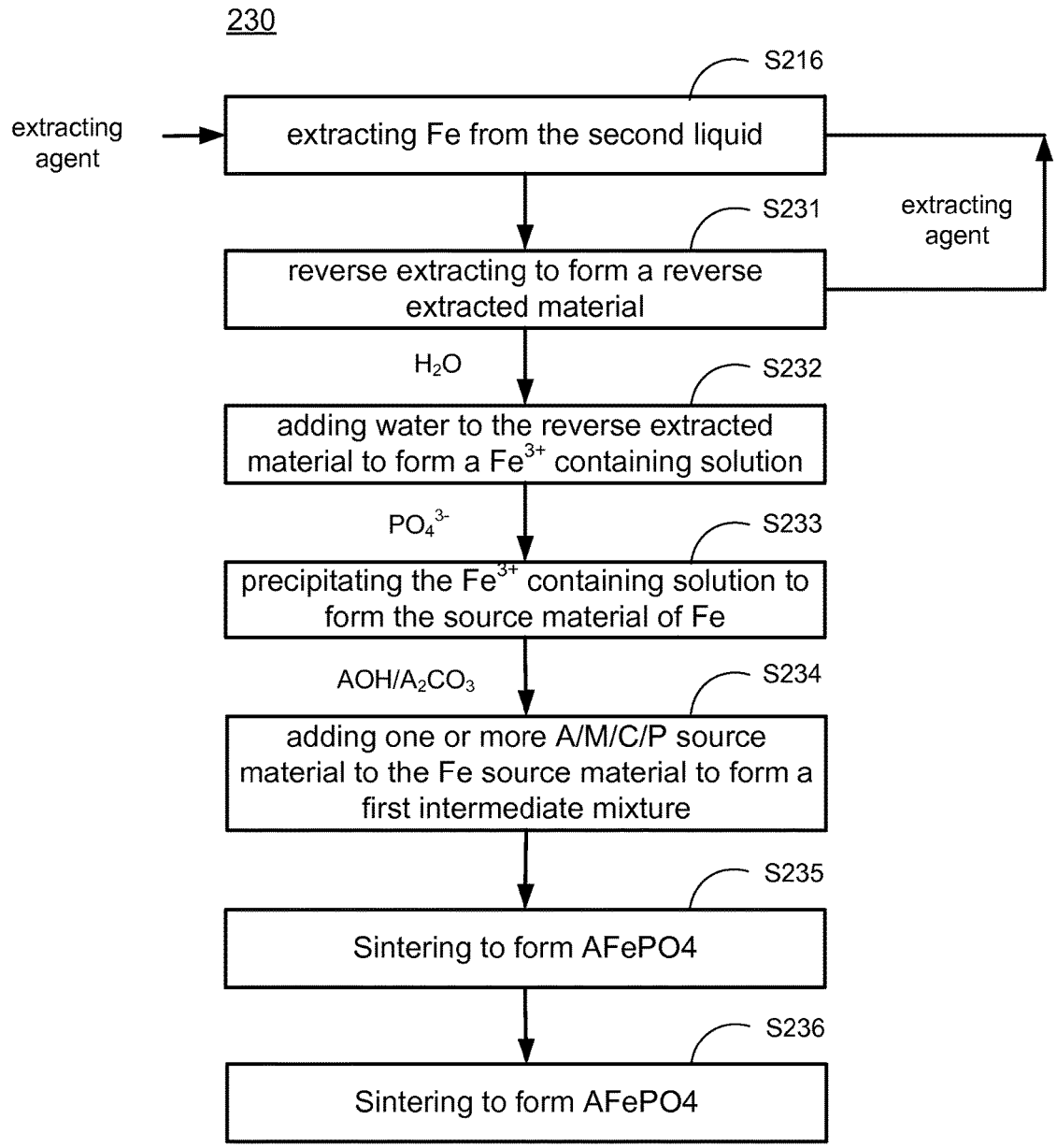
FIG. 2B shows a flowchart of a method of producing an electrode active material from source material of Fe of FIG. 2A according to certain embodiments of the present invention.

FIG. 2A shows a flowchart of a method of producing electrode active materials from ilmenite according to certain embodiments of the present invention. As shown in FIG. 2A, the systematic method 200 includes a molten salt operation 210, a first operation 230, and a second operation 250. Referring to FIG. 2A, molten salt operation 210 generate a source material of Fe and a source material of Ti from the ilmenite at steps S115 and S117 respectively. Then as shown in FIG. 2B, a first operation is performed to the source material of Fe to obtain at least one of the electrode active materials. Further, as shown in FIG. 2C and FIG. 2D, a second operation is performed to the source material of Ti to obtain at least one of the electrode active materials.

As shown in FIG. 2A, in certain embodiments, the generating a source material of Ti and a source material of Fe from an ilmenite includes the steps of S211 to S219. In step 211, the mineral ilmenite is provided. In the operation 5212, KOH is mixed with the ilmenite to form a first mixture, with air passing through the mixture. In certain embodiments, the concentration of KOH is 80%. In certain embodiments, the ilmenite is decomposed at low temperature by the 80% KOH under air flow. In step S213, the first mixture is separated to form a first liquid and a first solid material. In certain embodiment, before separating, the first mixture is added with water. The first liquid can be recycled to obtain KOH, and used in the step S211. In step 214, the first solid mixture is dissolved in hydrogen chloride (HCl) to form a second mixture. In step S215, the second mixture is separated to form a second liquid and a second solid material. The second solid material may further be treated to protect environment or extract useful material. In step S216, Fe is extracted from the second liquid by adding extracting agent, such that the source material of Fe and a remnant material are formed. The extracted source material of Fe can then be used in the first operation 230 to produce an electrode active material. In step 217, the remnant material, which contains Ti, is hydrolyzed to form a third mixture. In step S218, the third mixture is filtered, such that a filtrate and a retained material are formed. The retained material comprises the source material of Ti. In step 219, at least a portion of the retained material is calcinated to form titanium dioxide ($TiO_2$). In certain embodiments, the calcination is performed without oxygen, or an inert environment.

FIG. 2B shows a flowchart of a method of producing an electrode active material from source material of Fe of FIG. 2A according to certain embodiments of the present invention.

As shown in FIG. 2B, the performing the first operation to the source material of Fe includes the steps of S231 to S236. In step 231, the Fe containing material that is extracted by the extracting agent from the second liquid in step 216, is reverse extracted to form a reverse extracted material. Then in step S232, water is added to the reverse extracted material to form a $Fe^{3+}$ containing solution, which has iron ion $Fe^{3+}$. In step S233, the $Fe^{3+}$ in the $Fe^{3+}$ containing solution is precipitated by a phosphate or a phosphoric acid to form iron phosphate, which is used as the source material of Fe, and the content of Fe is determined in the source material of Fe. In steps 234, at least one source material selected from a source material of A, a source material of M, a source material of C, and a source material of P is added to the insoluble source material of Fe to form the first intermediate mixture. In step S235, the first intermediate mixture is ball-milled. In step S236, the ball-milled material is then sintered to form an electrode active material. In certain embodiments, the sintering is performed without oxygen, or an inert environment.

The second operation 250 is similar to the second operations 150A and 150B as shown in FIG. 1C and FIG. 1D, and as described above.

Figure 3:
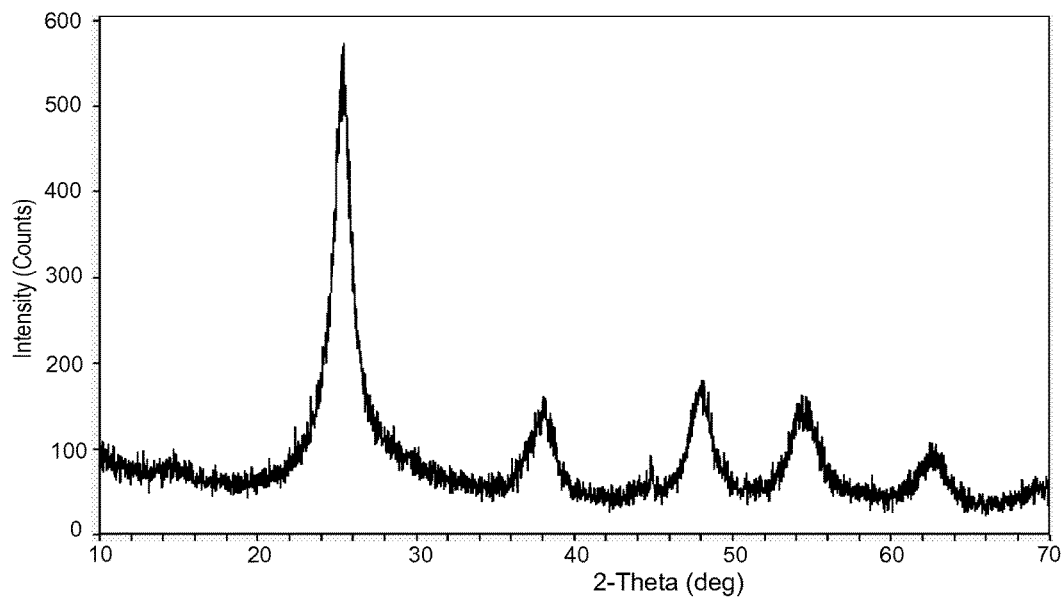
FIG. 3 shows an X-ray diffraction pattern of the result dried hydrated titanium dioxide according to one embodiment of the present invention.
Figure 4:
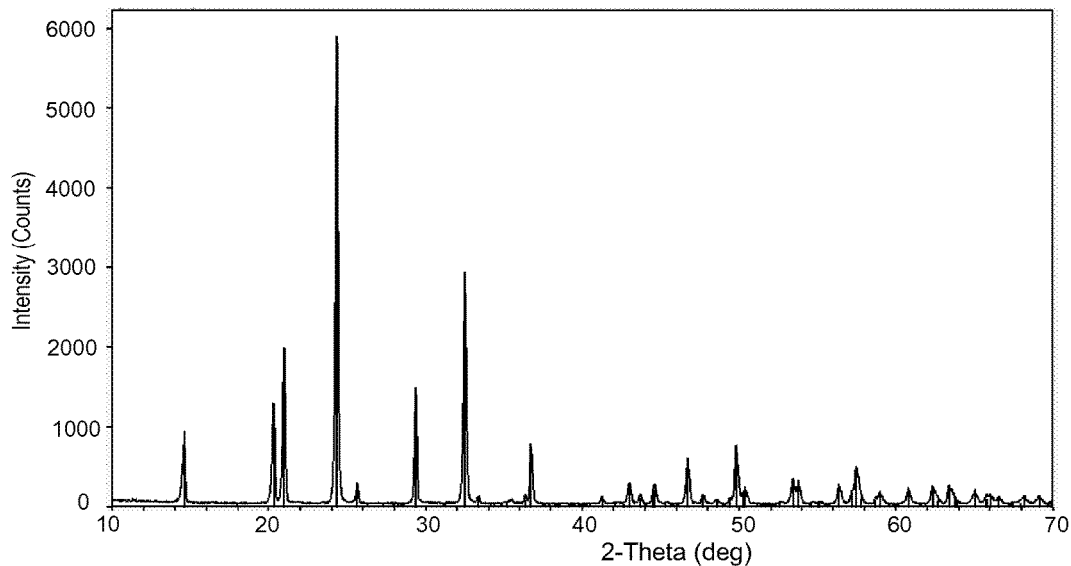
FIG. 4 shows an X-ray diffraction pattern of the result $NaTi_2(PO_4)_3$ according to one embodiment of the present invention.
Figure 5:
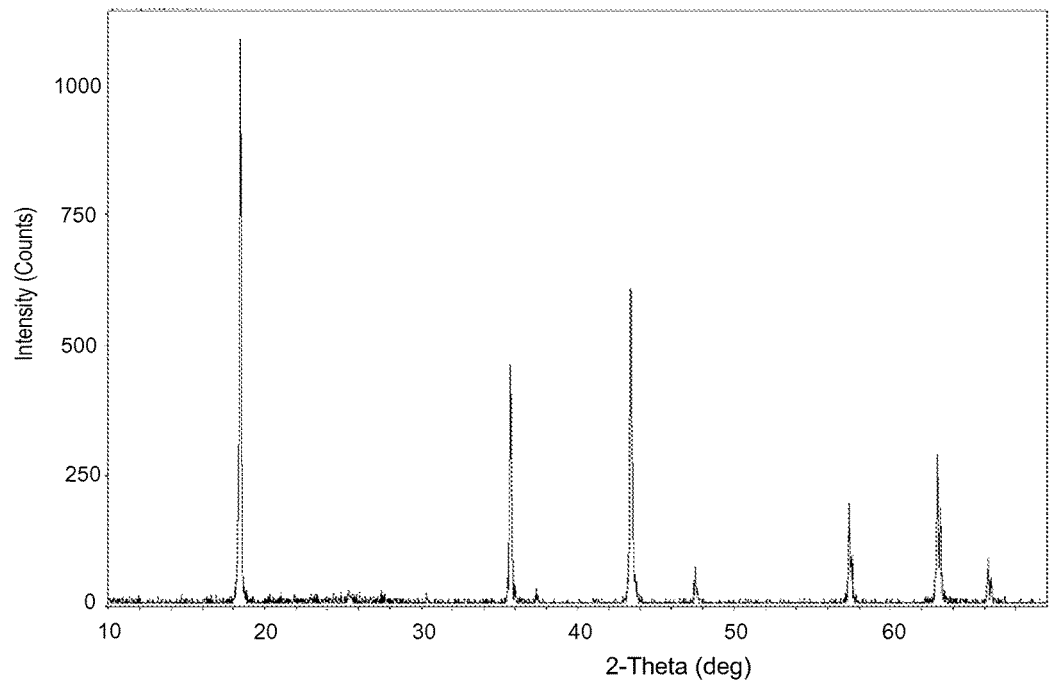
FIG. 5 shows an X-ray diffraction pattern of the result $Li_4Ti_5O_{12}$ according to one embodiment of the present invention.
Figure 6:
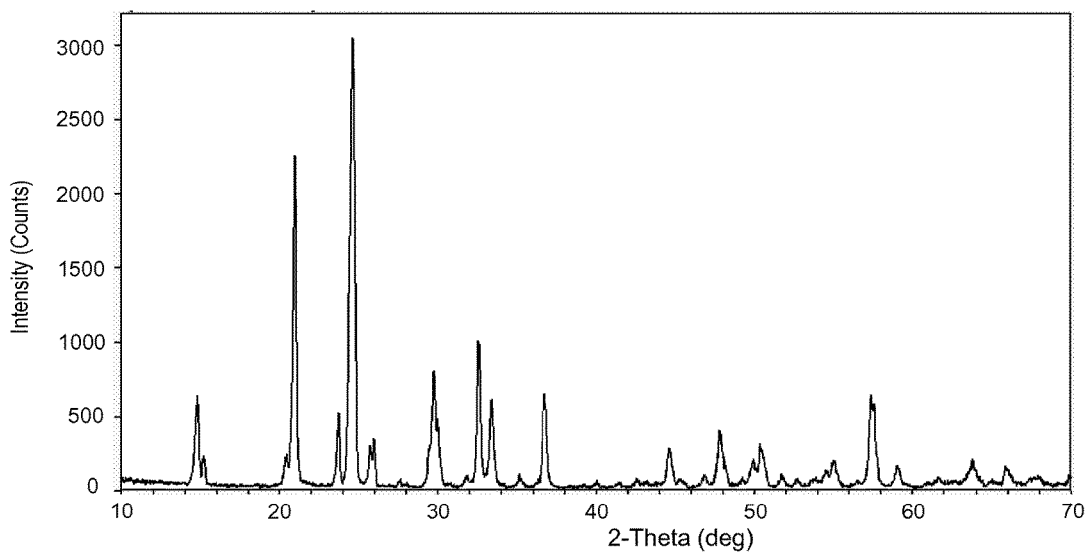
FIG. 6 shows an X-ray diffraction pattern of the result $LiTi_2(PO_4)_3$ according to one embodiment of the present invention.
Figure 7:
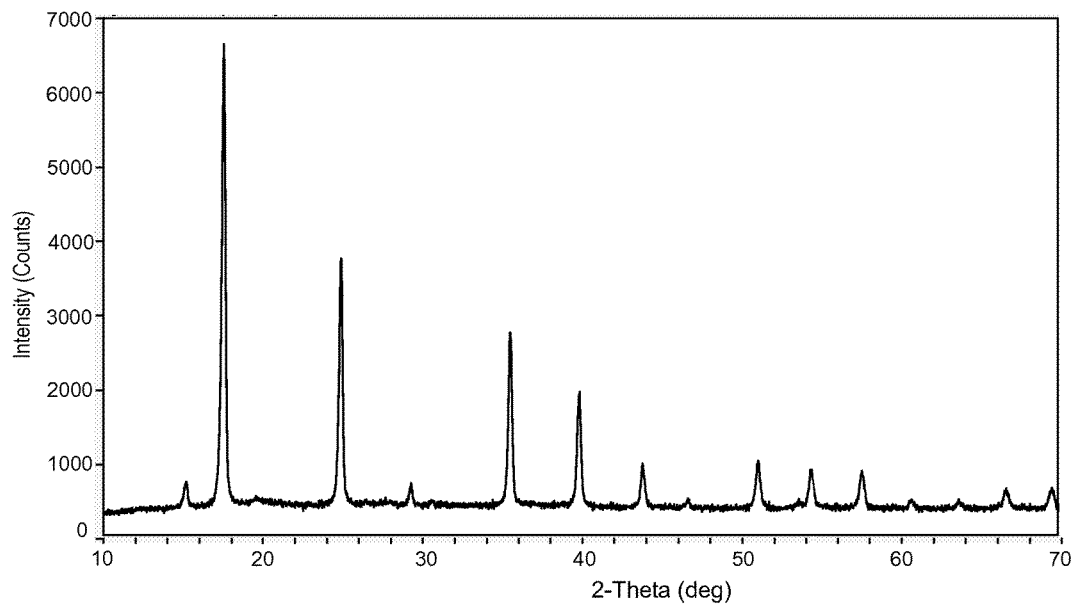
FIG. 7 shows an X-ray diffraction pattern of the result $K_aCu_bFe(CN)_6$ according to one embodiment of the present invention.
Figure 8:
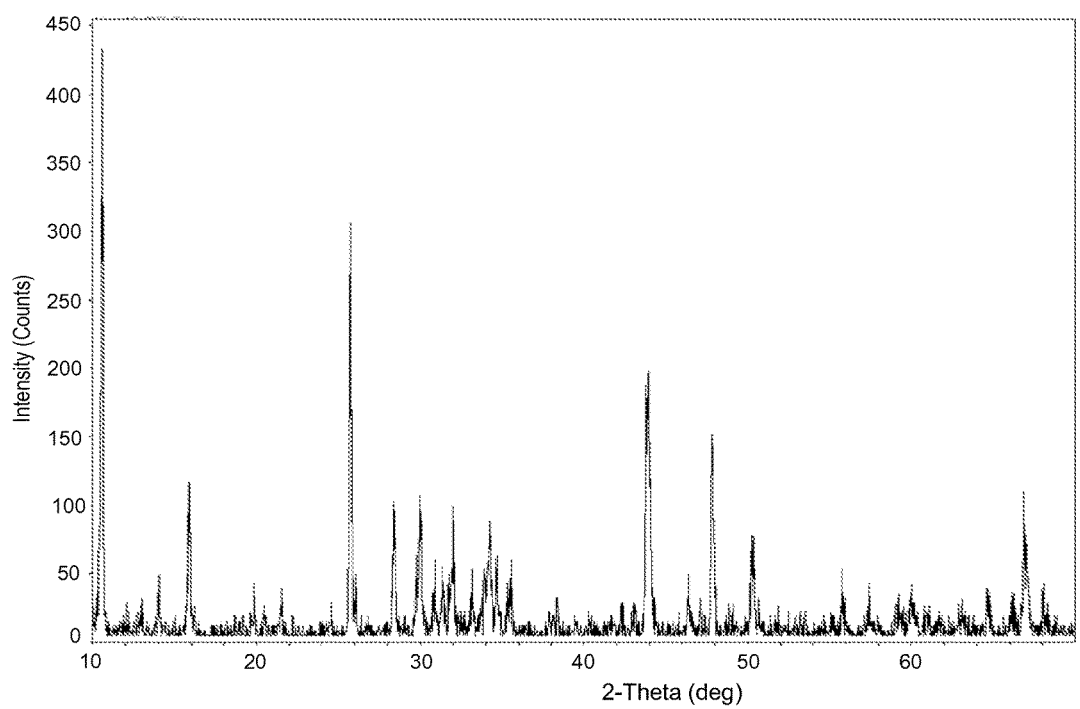
FIG. 8 shows an X-ray diffraction pattern of the result $Na_2Ti_3O_7$ according to one embodiment of the present invention.
Figure 9:
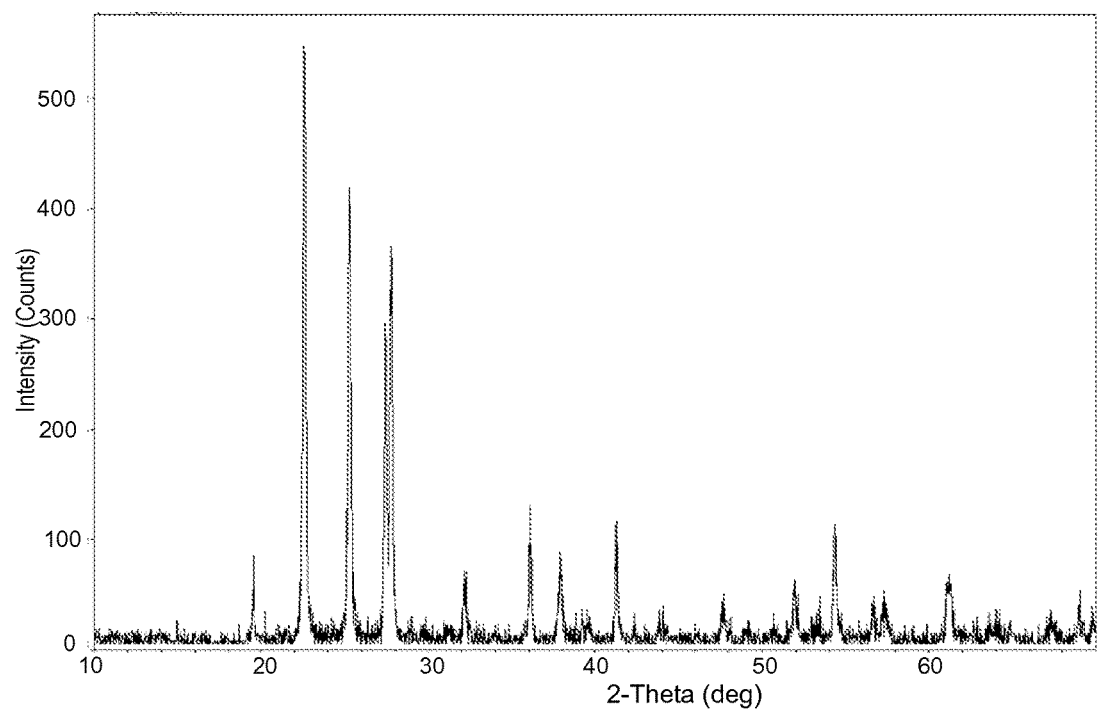
FIG. 9 shows an X-ray diffraction pattern of the result $TiP_2O_7$ according to one embodiment of the present invention.

In another aspect, the present invention relates to electrode active materials synthesized according to the method as disclosed above. FIG. 3 shows an X-ray diffraction pattern of the result dried hydrated titanium dioxide according to one embodiment of the present invention. FIG. 4 shows an X-ray diffraction pattern of the result $NaTi_2(PO_4)_3$ according to one embodiment of the present invention. FIG. 5 shows an X-ray diffraction pattern of the result $Li_4Ti_5O_{12}$ according to one embodiment of the present invention. FIG. 6 shows an X-ray diffraction pattern of the result $LiTi_2(PO_4)_3$ according to one embodiment of the present invention. FIG. 7 shows an X-ray diffraction pattern of the result $K_aCu_bFe(CN)_6$ according to one embodiment of the present invention. FIG. 8 shows an X-ray diffraction pattern of the result $Na_2Ti_3O_7$ according to one embodiment of the present invention. FIG. 9 shows an X-ray diffraction pattern of the result $TiP_2O_7$ according to one embodiment of the present invention.

In a further aspect, the present invention relates to a device or device system for accomplishing the above described method.

EXAMPLES AND IMPLEMENTATIONS OF THE INVENTION

Without intent to limit the scope of the invention, exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

The Examples 1-10 produces electrode active material through the ion pathway incorporated in the systematic method for processing ilmenite. The Examples 11-16 produces electrode active material through the Ti pathway incorporated in the systematic method for processing ilmenite.

Example 1

Producing $LiFePO_4$ from Source Material of Fe

In one embodiment, the electrode active composite material is $LiFePO_4$. Referring to FIG. 1B, to make $LiFePO_4$, the purified $FeSO_4$ is dissolved in water to form a solution. Hydrogen peroxide ($H_2O_2$) is added to the solution, such that the $Fe^{2+}$ in the solution is substantially completely oxidized to $Fe^{3+}$. Then at least one phosphoric acid or phosphate, such as $H_3PO_4$, $NH_4H_2PO_4$, $(NH_4)_2HPO_4$, $NaH_2PO_4$, $Na_2HPO_4$, is added to the solution. The molar ratio of the phosphorus in the phosphoric acid or phosphate to the $Fe^{3+}$ in the solution is P/Fe=1.0-1.2. After adding the at least one phosphoric acid or phosphate, the pH of the solution is adjusted by, for example, ammonium hydroxide, sodium hydroxide, sodium carbonate, or sodium bicarbonate, to about pH 1.0-3.5, such that iron phosphate ($FePO_4$) is precipitated from the solution. The $FePO_4$ may be further washed to remove impurities, such as sulfur or sodium, to form the source material of Fe. A source material of Li according to predetermined Li/Fe/P molar ratio, and a certain amount of source material of C are added to the source material of Fe to form an intermediate mixture. The molar ratio may be about Li:Fe:P=1.0-1.05:1:1. The intermediate mixture is then performed with ball-milling and drying procedures, and disposed in an inert environment for sintering to form the positive electrode material $LiFePO_4$.

Example 2

Producing $LiFe_xV_{(1-x)}PO_4$ from Source Material of Fe

In one embodiment, the electrode active composite material is $LiFe_xV_{(1-x)}PO_4$. Referring to FIG. 1B, to make $LiFe_xV_{(1-x)}PO_4$, the purified $FeSO_4$ is dissolved in water to form a solution. $H_2O_2$ is added to the solution, such that $Fe^{2+}$ in the solution is substantially completely oxidized to $Fe^{3+}$. In one embodiment, the added $H_2O_2$ is a solution of about 27% of $H_2O_2$ in water. Then at least one phosphoric acid or phosphate is added to the solution. The molar ratio of the phosphorus in the added phosphoric acid or phosphate to the $Fe^{3+}$ in the solution is P/Fe=1.0-1.2. After adding the at least one phosphoric acid or phosphate, the pH of the solution is adjusted by, for example, ammonium hydroxide, sodium hydroxide, sodium carbonate, or sodium bicarbonate, to about pH 1.0-3.5, such that $FePO_4$ is precipitated from the solution. The $FePO_4$ may be further washed to remove impurities, such as sulfur or sodium, to form the source material of Fe. A source material of Li, a source material of V according to predetermined Li/V/Fe molar ratio, and a certain amount of source material of C are added to the source material of Fe to form an intermediate mixture. The molar ratio may be about Li:M:P=1.0-1.05:1:1, where M may be the total of Fe and V. The intermediate mixture is then performed with ball-milling and drying procedures, and disposed in an inert environment for sintering to form the positive electrode material $LiFe_xV_{(1-x)}PO_4$.

Example 3

Producing $LiFePO_4$ From Source Material of Fe

In one embodiment, the electrode active composite material is $LiFePO_4$. Referring to FIG. 1B, to make $LiFePO_4$, the purified $FeSO_4$ crystals are dissolved in water to form a solution. Then at least one phosphoric acid or phosphate is added to the solution. The molar ratio of the phosphorus in the phosphoric acid or phosphate to the Fe ion in the solution is P/Fe=1.4-1.6. After adding the at least one phosphoric acid or phosphate, the pH of the solution is adjusted by, for example, ammonium hydroxide, sodium hydroxide, sodium carbonate, or sodium bicarbonate, to about pH 3.5-6.5, such that iron (II) phosphate ($Fe_3(PO_4)_2$) is precipitated from the solution. The $Fe_3(PO_4)_2$ may be further washed to remove impurities, such as sulfur or sodium, to form the source material of Fe. A source material of Li and a source material of phosphorus (P) according to predetermined Li/Fe/P molar ratio, and a certain amount of source material of C are added to the source material of Fe to form an intermediate mixture. The molar ratio may be about Li:Fe:P=1.0-1.05:1:1. The intermediate mixture is then performed with ball-milling and drying procedures, and disposed in an inert environment for sintering to form the positive electrode material $LiFePO_4$.

Example 4

Producing $LiFePO_4$ from Source Material of Fe

In one embodiment, the electrode active composite material is $LiFePO_4$. Referring to FIG. 1B, to make $LiFePO_4$, the purified $FeSO_4$ crystals are dissolved in water to form a solution. Then at least one oxalic acid or oxalate is added to the solution. The molar ratio of the oxalic acid or oxalate to the Fe ion in the solution is oxalic acid or oxalate/Fe=1.0-

1.2. After adding the at least one oxalic acid or oxalate, the pH of the solution is adjusted by, for example, ammonium hydroxide, sodium hydroxide, sodium carbonate, or sodium bicarbonate, to about pH 3.5-6.5, such that iron (II) oxalate ($FeC_2O_4$) is precipitated from the solution. The $FeC_2O_4$ may be further washed to remove impurities, such as sulfur or sodium, to form the source material of Fe. A source material of Li and a source material of P according to predetermined Li/Fe/P molar ratio, and a certain amount of source material of C are added to the source material of Fe to form an intermediate mixture. The molar ratio may be about Li:Fe:P=1.0-1.05:1:1. The intermediate mixture is then performed with ball-milling and drying procedures, and disposed in an inert environment for sintering to form the positive electrode material $LiFePO_4$.

Example 5

Producing $LiFe_xMn_{(1-x)}PO_4$ From Source Material of Fe

In one embodiment, the electrode active composite material is $LiFe_xMn_{(1-x)}PO_4$. Referring to FIG. 1B, to make $LiFe_xMn_{(1-x)}PO_4$, the purified $FeSO_4$ is dissolved in water to form a solution. Then at least one oxalic acid or oxalate is added to the solution. The molar ratio of the oxalic acid or oxalate to the Fe ion in the solution is oxalic acid or oxalate/Fe=1.0-1.05. After adding the at least one oxalic acid or oxalate, the pH of the solution is adjusted by, for example, ammonium hydroxide, sodium hydroxide, sodium carbonate, or sodium bicarbonate, to about pH 4.0-6.5, such that iron (II) oxalate ($FeC_2O_4$) is precipitated from the solution. The $FeC_2O_4$ may be further washed to remove impurities, such as sulfur or sodium, to form the source material of Fe. A source material of Li, a source material of P, and a source material of Mn according to predetermined Li/Fe/Mn/P molar ratio, and a certain amount of a source material of C are added to the source material of Fe to form an intermediate mixture. The molar ratio may be about Li:M:P=1.0-1.05:1:1, where M is the total of Fe and Mn. The intermediate mixture is then performed with ball-milling and drying procedures, and disposed in an inert environment for sintering to form the positive electrode material $LiFe_xMn_{(1-x)}PO_4$.

Example 6

Producing $LiFePO_4$ from Source Material of Fe

In one embodiment, the electrode active composite material is $LiFePO_4$. Referring to FIG. 1B, to make $LiFePO_4$, the purified $FeSO_4$ is dissolved in water to form a solution. Then a carbonate is added to the solution. The molar ratio of the carbonate to the Fe ion in the solution is carbonate/Fe=1.0-1.05. After adding the carbonate, the pH of the solution is adjusted by, for example, ammonium hydroxide, sodium hydroxide, sodium carbonate, or sodium bicarbonate, to about pH 4.5-7.0, such that iron (II) carbonate ($FeCO_3$) is precipitated from the solution. The $FeCO_3$ may be further washed to remove impurities, such as sulfur or sodium, to form the source material of Fe. A source material of Li and a source material of P according to predetermined Li/Fe/P molar ratio, and a certain amount of source material of C are added to the source material of Fe to form an intermediate mixture. The molar ratio may be about Li:Fe:P=1.0-1.05:1:1. The intermediate mixture is then performed with ball-milling and drying procedures, and disposed in an inert environment for sintering to form the positive electrode material $LiFePO_4$.

Example 7

Producing $LiFe_xMn_{(1-x)}PO_4$ from Source Material of Fe

In one embodiment, the electrode active composite material is $LiFe_xMn_{(1-x)}PO_4$. Referring to FIG. 1B, to make $LiFe_xMn_{(1-x)}PO_4$, the purified $FeSO_4$ is dissolved in water to form a solution. Then a carbonate is added to the solution. The molar ratio of the carbonate to the Fe ion in the solution is carbonate/Fe=1.0-1.05. After adding the at least one carbonate, the pH of the solution is adjusted by, for example, ammonium hydroxide, sodium hydroxide, sodium carbonate, or sodium bicarbonate, to about pH 4.5-7.0, such that iron (II) carbonate ($FeCO_3$) is precipitated from the solution. The $FeCO_3$ may be further washed to remove impurities, such as sulfur or sodium, to form the source material of Fe. A source material of Li, a source material of P, and a Mn source material according to predetermined Li/Fe/Mn/P molar ratio, and a certain amount of source material of C are added to the source material of Fe to form an intermediate mixture. The molar ratio may be about Li:M:P=1.0-1.05:1:1, where M is the total of Fe and Mn. The intermediate mixture is then performed with ball-milling and drying procedures, and disposed in an inert environment for sintering to form the positive electrode material $LiFe_xMn_{(1-x)}PO_4$.

Example 8

Producing $LiFePO_4$ from Source Material of Fe

In one embodiment, the electrode active composite material is $LiFePO_4$. Referring to FIG. 1B, to make $LiFePO_4$, the purified $FeSO_4$ is dissolved in water to form a solution. Then the pH of the solution is adjusted by, for example, ammonium hydroxide or/and sodium hydroxide or/and sodium carbonate or/and sodium bicarbonate, to about pH 4.5-7.0, such that iron (II) hydroxide ($Fe(OH)_2$) is precipitated from the solution. The $Fe(OH)_2$ may be further washed to remove impurities, such as sulfur or sodium, to form the source material of Fe. A source material of Li and a source material of P according to predetermined Li/Fe/P molar ratio, and a certain amount of source material of C are added to the source material of Fe to form an intermediate mixture. The molar ratio may be about Li:Fe:P=1.0-1.05:1:1. The intermediate mixture is then performed with ball-milling and drying procedures, and disposed in an inert environment for sintering to form the positive electrode material $LiFePO_4$.

Example 9

Producing $LiFePO_4$ from Source Material of Fe

In one embodiment, the electrode active composite material is $LiFePO_4$. Referring to FIG. 1B, to make $LiFePO_4$, the purified $FeSO_4$, a source material of Li and a source material of P according to a molar ratio of Li/Fe/P=4:1:1 are dissolved in water, and disposed in a reactor to perform a high pressure reaction at about 160-200° C. for 6-12 hours, to precipitate $FeLiPO_4$. The precipitated $FeLiPO_4$ is separated from the reaction solution mixture, and washed. A certain amount of source material of C is added to the washed $LiFePO_4$ to form an intermediate mixture. The intermediate mixture is then performed with ball-milling and drying procedures, and disposed in an inert environment for sintering to form the positive electrode material $LiFePO_4$.

Example 10

Producing $K_aCu_bFe(CN)_6$ from Source Material of Fe

In one embodiment, the electrode active composite material is $K_aCu_bFe(CN)_6$. Referring to FIG. 1B, to make $K_aCu_b$-$Fe(CN)_6$, the purified $FeSO_4$ is used as a source material of Fe to make intermediate materials $K_4Fe(CN)_6$ and $K_3Fe(CN)_6$.

In one example, 5 ml of 0.25 M $K_4Fe(CN)_6$ solution is mixed with 4 ml of 0.5 mol/L (M) $CuSO_4$, and react at certain temperature, to form a yellowish-brown precipitant of $K_aCu_bFe(CN)_6$. The precipitant is separated by centrifugation. The separated precipitant is washed and dried, to form the Prussian Blue (PB) analogues electrode material $K_aCu_bFe(CN)_6$.

Example 11

Producing $NaTi_2(PO_4)_3$ from Source Material of Ti

In one embodiment, the electrode active composite material is $NaTi_2(PO_4)_3$. Referring to FIG. 1C, to make $NaTi_2(PO_4)_3$, the hydrated titanium dioxide ($H_2TiO_3$) obtained from the step S117 as shown in FIG. 1A, either washed once or twice or more (with corresponding Fe content around 800 ppm or 400 ppm or 50 ppm), with or without drying, is mixed with a source material of Na and a source material of P according to predetermined Na/Ti/P molar ratio, and a certain amount of source material of C to form an intermediate mixture. The intermediate mixture is then performed with ball-milling and sintering to form the electrode active material $NaTi_2(PO_4)_3$.

In an example, the $H_2TiO_3$ is obtained by hydrolyzing titanium sulfate. The obtained $H_2TiO_3$ is washed twice, without drying, and then chemically titrated. The measured $H_2TiO_3$ content by titration is about 47.08%, and the impurity Fe content is about 456 ppm. 100.00 gram (g) sodium carbonate, 640.2 g the above $H_2TiO_3$, 652.61 g of 85% phosphoric acid, and 80 g glucose are weighed and mixed. The mixture is ball-milled for about 3 hours, and dried to obtain $NaTi_2(PO_4)_3$ precursor. The precursor is sintered at 900° C. under inert condition (without oxygen) for two hours, to obtain the electrode active material $NaTi_2(PO_4)_3$ enclosed by carbon.

In another example, the $H_2TiO_3$ is obtained by hydrolyzing titanium sulfate. The obtained $H_2TiO_3$ is washed twice, without drying, and then chemically titrated. The measured $H_2TiO_3$ content by titration is about 43.92%, and the Fe content is about 678 ppm. 100.00 g sodium carbonate, 676.40 g the above $H_2TiO_3$, and 686.26 g of 85% phosphoric acid are weighed and mixed. The mixture is ball-milled for about 10 hours, and dried to obtain $NaTi_2(PO_4)_3$ precursor. The precursor is sintered at 900° C. under air condition for nine hours, to obtain the electrode active material $NaTi_2(PO_4)_3$.

Example 12

Producing $LiTi_2(PO_4)_3$ from Source Material of Ti

In one embodiment, the electrode active composite material is $LiTi_2(PO_4)_3$. Referring to FIG. 1C, to make $LiTi_2(PO_4)_3$, the hydrated titanium dioxide ($H_2TiO_3$) obtained from the step S117 as shown in FIG. 1A, either washed once or twice or more (with corresponding Fe content around 800 ppm or 400 ppm or 50 ppm), with or without drying, is mixed with a source material of Li and a source material of P according to predetermined Li/Ti/P molar ratio, and a certain amount of source material of C to form an intermediate mixture. The intermediate mixture is then performed with ball-milling and sintering to form the electrode active material $LiTi_2(PO_4)_3$.

In one example, the $H_2TiO_3$ is obtained by hydrolyzing titanium sulfate. The obtained $H_2TiO_3$ is washed twice, without drying, and then chemically titrated. The measured $H_2TiO_3$ content by titration is about 43.92%, and the Fe content is about 678 ppm. 50 g lithium carbonate, 482 g the above $H_2TiO_3$, 464.4 g of 85% phosphoric acid, and 80 g glucose are weighed and mixed. The mixture is ball-milled for about 5 hours, and dried to obtain $LiTi_2(PO_4)_3$ precursor. The precursor is sintered at 850° C. under inert condition (without oxygen) for 3 hours, to obtain the electrode active material $LiTi_2(PO_4)_3$ enclosed by carbon.

Example 13

Producing $Li_4Ti_5O_{12}$ from Source Material of Ti

In one embodiment, the electrode active composite material is lithium titanate $Li_4Ti_5O_{12}$. Referring to FIG. 1D, to make $Li_4Ti_5O_{12}$, the hydrated titanium dioxide ($H_2TiO_3$) obtained from the step S117 as shown in FIG. 1A, either washed once or twice or more (with corresponding Fe content around 800 ppm or 400 ppm or 50 ppm), with or without drying, is mixed with a Li source material according to a predetermined Li/Ti molar ratio, and a certain amount of source material of C to form an intermediate mixture. The intermediate mixture is then performed with ball-milling and sintering to form the electrode active material $Li_4Ti_5O_{12}$.

In one example, the $H_2TiO_3$ is obtained by hydrolyzing titanium sulfate. The obtained $H_2TiO_3$ is washed twice, without drying, and then chemically titrated. The measured $H_2TiO_3$ content by titration is about 43.92%, and the Fe content is about 678 ppm. 50 g lithium carbonate, and 301.5 g the above $H_2TiO_3$ are weighed and mixed. The mixture is ball-milled for about 15 hours, and dried to obtain $Li_4Ti_5O_{12}$ precursor. The precursor is sintered at 850° C. under air condition for 12 hours, to obtain the electrode active material $Li_4Ti_5O_{12}$ without enclosed by carbon.

In another example, the $H_2TiO_3$ is obtained by hydrolyzing titanium sulfate. The obtained $H_2TiO_3$ is washed twice, without drying, and then chemically titrated. The measured $H_2TiO_3$ content by titration is about 43.92%, and the Fe content is about 678 ppm. 50 g lithium carbonate, 301.5 g the above $H_2TiO_3$, and 50 g glucose are weighed and mixed. The mixture is ball-milled for about 3 hours, and dried to obtain $Li_4Ti_5O_{12}$ precursor. The precursor is sintered at 900° C. under inert condition (without oxygen) for 5 hours, to obtain the electrode active material $Li_4Ti_5O_{12}$ with carbon enclosure.

Example 14

Producing $Na_2Li_2Ti_6O_{14}$ from Source Material of Ti

In one embodiment, the electrode active composite material is $Na_2Li_2Ti_6O_{14}$. Referring to FIG. 1D, to make $Na_2Li_2Ti_6O_{14}$, the hydrated $H_2TiO_3$ obtained from the step S117 as shown in FIG. 1A, either washed once or twice or more (with corresponding Fe content around 800 ppm or 400 ppm or 50 ppm), with or without drying, is mixed with a source material of Li according to a predetermined Li/Na/Ti molar ratio, and a certain amount of source material of C to form an intermediate mixture. The intermediate mixture is then performed with ball-milling and sintering to form the electrode active material $Na_2Li_2Ti_6O_{14}$.

Example 15

Producing $Na_2Ti_3O_7$ from Source Material of Ti

In one example, the $H_2TiO_3$ is obtained by hydrolyzing titanium sulfate. The obtained $H_2TiO_3$ is washed twice, without drying, and then chemically titrated. The measured $H_2TiO_3$ content by titration is about 43.92%, and the Fe content is about 678 ppm. 4 g sodium carbonate, 20.58 g the above $H_2TiO_3$ are weighed and mixed. The mixture is ball-milled for about 1 hours, to obtain $Na_2Ti_3O_7$ precursor. The precursor is sintered at 750° C. under inert condition (without oxygen) for 12 hours, to obtain the electrode active material $Na_2Ti_3O_7$.

Example 16

Producing $TiP_2O_7$ from Source Material of Ti

In one embodiment, the electrode active composite material is $TiP_2O_7$. Referring to FIG. 1D, to make $TiP_2O_7$, the hydrated $H_2TiO_3$ obtained from the step S117 as shown in FIG. 1A, either washed once or twice or more (with corresponding Fe content around 800 ppm or 400 ppm or 50 ppm), with or without drying, is mixed with a source material of P according to a predetermined Ti/P molar ratio, and a certain amount of source material of C to form an intermediate mixture. The intermediate mixture is then performed with ball-milling and sintering to form the electrode active material $TiP_2O_7$.

In one example, the $H_2TiO_3$ is obtained by hydrolyzing titanium sulfate. The obtained $H_2TiO_3$ is washed twice, without drying, and then chemically titrated. The measured $H_2TiO_3$ content by titration is about 47.08%, and the Fe content is about 456 ppm. 17.0 g the above $H_2TiO_3$ and 23.06 g of 85% phosphoric acid are weighed and mixed to obtain $TiP_2O_7$ precursor. The precursor is sintered at 850° C. for 10 hours, to obtain the electrode active material $TiP_2O_7$.

Example 17

Purification of $FeSO_4$

In one embodiment, referring to FIG. 1A, the crystal of $FeSO_4$ is obtained from the step S116. The obtained $FeSO_4$ is re-dissolved in 50-80° C. hot water to produce a saturated solution. The hot saturated solution is transferred to crystallization pond or pool. The temperature of the hot saturated solution is decreased to re-crystallize $FeSO_4$, which has a higher purity than the $FeSO_4$ obtained from the step S116.

In another embodiment, referring to FIG. 1A, the crystal of $FeSO_4$ is obtained from the step S116. The obtained $FeSO_4$ is re-dissolved in water to form a 1 mol/L (M) solution. A small amount of phosphoric acid is added as precipitating agent. Then the pH of the solution is adjusted using an alkali to about 4.5-6.5. The precipitant is removed, and the solution contains purified $FeSO_4$.

Example 18

Producing $LiFePO_4$ from Purified $FeSO_4$

In one embodiment, the purified $FeSO_4$ from the above example 16 is used to make a 0.8 M $FeSO_4$ solution. 5 liter (L) of the 0.8 M $FeSO_4$ solution is added with 485 g 85% phosphoric acid and thoroughly mixed. Then the mixture is added with 27% $H_2O_2$ solution, until all the $Fe^{2+}$ is oxidized to $Fe^{3+}$. The pH of the oxidized solution is then adjusted to about pH=2.0 using ammonia water, until all the Fe is precipitated completely. The precipitant is separated by centrifugation, and then washed and dried to obtain $FePO_4 \cdot 2H_2O$.

100 g lithium carbonate, 501.16 g the above $FePO_4 \cdot 2H_2O$, and 45 g glucose are weighed and mixed. The mixture is ball-milled for about 10 hours, and dried to obtain $LiFePO_4$ precursor. The precursor is sintered at 650° C. under inert condition (without oxygen) for 8 hours, to obtain the electrode active material $LiFePO_4$.

Example 19

Producing $LiFePO_4$ from Purified $FeSO_4$

In one embodiment, the purified $FeSO_4$ from the above example 16 is used to make a 0.8 M $FeSO_4$ solution. 5 L of the 0.8 M $FeSO_4$ solution is added with 516 g oxalic acid as precipitating agent. Then the pH of the solution is adjusted using ammonia water, until all the Fe is precipitated. The precipitant is separated by centrifugation, and washed and dried to obtain iron oxalate.

100 g lithium carbonate, 479.2 g the above iron oxalate, 306.77 g ammonium dihydrogen phosphate ($NH_4H_2PO_4$), and 35 g glucose are weighed and mixed. The mixture is ball-milled for about 10 hours, and dried to obtain $LiFePO_4$ precursor. The precursor is sintered at 650° C. under inert condition (without oxygen) for about 8 hours, to obtain the electrode active material $LiFePO_4$.

FIGS. 3-9 are X-ray diffraction patterns of the materials according to certain embodiments of the present invention. FIG. 3 shows an X-ray diffraction pattern of the dried hydrated titanium dioxide. FIG. 4 shows an X-ray diffraction pattern of the $NaTi_2(PO_4)_3$. FIG. 5 shows an X-ray diffraction pattern of the $Li_4Ti_5O_{12}$. FIG. 6 shows an X-ray diffraction pattern of the $LiTi_2(PO_4)_3$. FIG. 7 shows an X-ray diffraction pattern of the $K_aCu_bFe(CN)_6$. FIG. 8 shows an X-ray diffraction pattern of the $Na_2Ti_3O_7$. FIG. 9 shows an X-ray diffraction pattern of the $TiP_2O_7$.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

What is claimed is:

1. A method of producing electrode active materials, comprising:
   generating a source material of titanium (Ti) and a source material of iron (Fe) from an ilmenite;
   performing a first operation to the source material of Fe, comprising:
   determining a content of Fe in the source material of Fe;
   preparing a first intermediate mixture comprising a source material of A, and the source material of Fe based on the determined content of Fe;
   ball-milling and drying the first intermediate mixture; and
   sintering the first intermediate mixture to form at least one of the electrode active materials; and
   performing a second operation to the source material of Ti, comprising:
   determining a content of Ti in the source material of Ti;
   preparing a second intermediate mixture comprising a source material of A and the source material of Ti based on the determined content of Ti;
   ball-milling and drying the second intermediate mixture; and
   sintering the second intermediate mixture to form at least one of the electrode active materials,
   wherein each electrode active material is selected from $A_aFe_xM_{(1-x)}(XO_4)_c$, $A_aTi_b(XO_4)_c$, $A_aTi_bO_c$, $A_aM_bFe(CN)_6$, or $A_aTi_bP_2O_7$, wherein each of a, b, and c, is equal to or greater than 0, and x is in the range of 0-1;
   wherein the A is selected from lithium (Li), sodium (Na), potassium (K), silver (Ag), rubidium (Rb), caesium (Cs), copper (Cu), magnesium (Mg), calcium (Ca), strontium (Sr), barium (Ba), ammonium ($NH_4$), or a mixture thereof;
   wherein M is an element selected from Mg, aluminum (Al), silicon (Si), Ca, Ti, vanadium (V), chromium (Cr), manganese (Mn), Fe, cobalt (Co), nickel (Ni), Cu, zinc (Zn), gallium (Ga), germanium (Ge), Sr, zirconium (Zr), niobium (Nb), molybdenum (Mo), tin (Sn), Ba, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutelium (Lu), hafnium (Hf), tantalum (Ta), tungsten (W), cadmium (Cd), or a mixture thereof;
   wherein X is an element selected from phosphorus (P), Si, sulfur (S), Mo, W, or a mixture thereof; and
   wherein the generating the source material of Ti and the source material of Fe from an ilmenite comprises:
   providing the ilmenute;
   dissolving the ilmenute in sulfuric acid to form a first mixture;
   reducing the first mixture using a reducing agent to form a second mixture;
   filtering the second mixture to form a first filtrate and a first retained material;
   crystallizing the first filtrate, and filtering to form a second filtrate and a second retained material, wherein the second retained material is the source material of Fe comprising $FeSo_4.7H_2O$ crystals;
   hydrolyzing the second filtrate to form a third mixture;
   filtering the third mixture to form a third filtrate and a third retained material, wherein the third retained material comprises the source of material of Ti; and
   calcinating at least a portion of the washed third retained material to form titanium dioxide ($TiO_2$).

2. The method of claim 1, wherein each of the content of Fe in the source material of Fe and the content of Ti in the source material of Ti is determined by titration.

3. The method of claim 1, wherein the performing a first operation to the source material of Fe further comprises purifying the source material of Fe to remove impurities of sulfur and others.

4. The method of claim 1, wherein the source material of A is selected from $Li_2CO_3$, LiOH, $Li_2O$, $Na_2CO_3$, NaOH, $Na_2O$, $K_2CO_3$, KOH, $K_2O$, $NH_4OH$, $NH_4HCO_3$, or a mixture thereof.

5. The method of claim 1, wherein the first intermediate mixture further comprises at least one source material selected from a source material of M, a source material of X, and a source material of carbon (C).

6. The method of claim 5, wherein a molar ratio of A:Fe/M:X in the first intermediate mixture is 1-1.05:1:1.

7. The method of claim 1, wherein the first intermediate mixture is ball-milled for 3-28 hours, and sintered at 350-900° C. for 5-15 hours.

8. The method of claim 1, wherein the performing a second operation to the source material of Ti further comprises purifying the source material of Ti to remove impurities.

9. The method of claim 1, wherein the second intermediate mixture further comprises at least one source material selected from a source material of X, or a source material of carbon (C).

10. The method of claim 9, wherein in the $A_aTi_b(XO_4)_c$, a is 1, b is 2, c is 3, X is P, such that the electrode active material is $ATi(PO_4)_3$, a molar ratio of A:Ti:P in the second intermediate mixture is 1:2:3, and a weight percentage of the source material of C to a total weight of the second intermediate mixture is 0-15%.

11. The method of claim 1, wherein in the $A_aTi_bO_c$, a is 4, b is 5, c is 12, such that the electrode active material is $A_4Ti_5O_{12}$, the second intermediate mixture further comprises a source material of carbon (C), a molar ratio of A:Ti in the second intermediate mixture is 4:5, and a weight percentage of the source material of C to a total weight of the second intermediate mixture is 0-15%.

12. The method of claim 1, wherein in the $A_aTi_bO_c$, c is 7, such that the electrode active composite material is $A_aTi_bO_7$, the second intermediate mixture further comprises a source material of Na, and a source material of carbon (C), a molar ratio of Na:Ti in the second intermediate mixture is 2:3, and a weight percentage of the source material of C to a total weight of the second intermediate mixture is 0-15%.

13. The method of claim 1, wherein the second intermediate mixture is ball-milled for 1-28 hours, and sintered at 350-900° C. for 0.5-10 hours.

14. The method of claim 1, wherein the second retained material is further purified by:
   redissolving the crystals of $FeSO_4.7H_2O$ to form a solution;
   precipitating impurities by adjusting the pH of the solution to between 4.5-6.5; and
   separating the insoluble precipitant to form a purified $FeSO_4.7H_2O$ solution, wherein the purified $FeSO_4.7H_2O$ solution is the source material of Fe;

or purified by:
recrystallizing the second retained material to form crystals of $FeSO_4 \cdot 7H_2O$;
dissolving the crystals of $FeSO_4 \cdot 7H_2O$ to form a solution; and
precipitating the solution by a precipitant agent to form an insoluble precipitant, wherein the insoluble precipitant is the source material of Fe.

15. The method of claim 14, wherein the precipitant agent is selected from phosphoric acid, phosphate, oxalic acid, oxalate, carbonic acid, carbonate, or a mixture thereof, and wherein the phosphate is selected from $NH_4H_2PO_4$, $(NH_4)_2HPO_4$, $NaH_2PO_4$, $Na_2HPO_4$, or a mixture thereof.

16. The method of claim 15, wherein the insoluble precipitant is selected from $FePO_4$, $Fe_xM_{(1-x)}PO_4$, $NH_4FePO_4$, $NH_4FeMPO_4$, $Fe_3(PO_4)_2$, $FeCO_3$, $FeC_2O_4$, $Fe(OH)_3$, $Fe(OH)_2$, or a mixture thereof.

17. A method of producing electrode active materials, comprising:
generating a source material of titanium (Ti) and a source material of iron (Fe) from an ilmenite;
performing a first operation to the source material of Fe, comprising:
determining a content of Fe in the source material of Fe;
preparing a first intermediate mixture comprising a source material of A, and the source material of Fe based on the determined content of Fe;
ball-milling and drying the first intermediate mixture; and
sintering the first intermediate mixture to form at least one of the electrode active materials; and
performing a second operation to the source material of Ti, comprising:
determining a content of Ti in the source material of Ti;
preparing a second intermediate mixture comprising a source material of A and the source material of Ti based on the determined content of Ti;
ball-milling and drying the second intermediate mixture; and
sintering the second intermediate mixture to form at least one of the electrode active materials,
wherein each electrode active material is selected from $A_aFe_xM_{(1-x)}(XO_4)_c$, $A_aTi_b(XO_4)_c$, $A_aTi_bO_c$, $A_aM_bFe(CN)_6$, or $A_aTi_bP_2O_7$, wherein each of a, b, and c, is equal to or greater than 0, and x is in the range of 0-1;
wherein the A is selected from lithium (Li), sodium (Na), potassium (K), silver (Ag), rubidium (Rb), caesium (Cs), copper (Cu), magnesium (Mg), calcium (Ca), strontium (Sr), barium (Ba), ammonium ($NH_4$), or a mixture thereof;
wherein M is an element selected from Mg, aluminum (Al), silicon (Si), Ca, Ti, vanadium (V), chromium (Cr), manganese (Mn), Fe, cobalt (Co), nickel (Ni), Cu, zinc (Zn), gallium (Ga), germanium (Ge), Sr, zirconium (Zr), niobium (Nb), molybdenum (Mo), tin (Sn), Ba, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutelium (Lu), hafnium (Hf), tantalum (Ta), tungsten (W), cadmium (Cd), or a mixture thereof;
wherein X is an element selected from phosphorus (P), Si, sulfur (S), Mo, W, or a mixture thereof; and
wherein the generating the source material of Ti and the source material of Fe from the ilmenite comprises:

providing the ilmenite;
adding 80% potassium hydroxide (KOH) and air to the ilmenite to form a first mixture;
separating the first mixture to form a first liquid and a first solid material;
dissolving the first solid mixture in hydrogen chloride to form a second mixture;
separating the second mixture to form a second liquid and a second solid material;
extracting Fe from the second liquid to form the source material of Fe and a remnant material;
hydrolyzing the remnant material to form a third mixture;
filtering the third mixture to form a filtrate and a retained material, wherein the retained material comprises the source material of Ti; and
calcinating at least a portion of the retained material to form titanium dioxide ($TiO_2$).

18. The method of claim 17, wherein the performing the first operation to the source material of Fe further comprises:
reverse extracting a Fe containing material to form a reverse extracted material, wherein the Fe containing material is extracted by the extracting agent from the second liquid; and
adding water to the reverse extracted material to form a $Fe^{3+}$ containing solution;
precipitating the $Fe^{3+}$ in the $Fe^{3+}$ containing material by a phosphate or a phosphoric acid to form iron phosphate.

19. A method of producing at least one electrode active material, comprising:
generating a source material of titanium (Ti) and a source material of iron (Fe) from an ilmenite; and
performing an operation to a source material of a base material, wherein the base material is Ti or Fe, wherein the operation comprises:
determining a content of the base material in the source material of the base material;
preparing an intermediate mixture comprising a source material of A and the source material of the base material based on the determined content of the base material;
ball-milling and drying the intermediate mixture; and
sintering the intermediate mixture to form the at least one electrode active material,
wherein the at least one electrode active material is selected from $A_aFe_xM_{(1-x)}(XO_4)_c$, $A_aTi_b(XO_4)_c$, $A_aTi_bO_c$, $A_aM_bFe(CN)_6$, or $A_aTi_bP_2O_7$, wherein each of a, b, and c is equal to or greater than 0, and x is in the range of 0-1;
wherein the A is selected from lithium (Li), sodium (Na), potassium (K), silver (Ag), rubidium (Rb), caesium (Cs), copper (Cu), magnesium (Mg), calcium (Ca), strontium (Sr), barium (Ba), ammonium ($NH_4$), or a mixture thereof;
wherein M is an element selected from Mg, aluminum (Al), silicon (Si), Ca, titanium (Ti), vanadium (V), chromium (Cr), manganese (Mn), cobalt (Co), nickel (Ni), Cu, zinc (Zn), gallium (Ga), germanium (Ge), Sr, zirconium (Zr), niobium (Nb), molybdenum (Mo), tin (Sn),lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutelium (Lu), hafnium (Hf), tantalum (Ta), tungsten (W), cadmium (Cd), or a mixture thereof;

wherein X is an element selected from phosphorus (P), Si, sulfur (S), Mo, W, or a mixture thereof; and wherein the generating the source material of Ti and the source material of Fe from an ilmenite comprises:

providing the ilmenite;

dissolving the ilmenite in sulfuric acid to form a first mixture;

reducing the first mixture using a reducing agent to form a second mixture;

filtering the second mixture to form a first filtrate and a first retained material;

crystallizing the first filtrate, and filtering to form a second filtrate and a second retained material, wherein the second retained material is the source material of Fe comprising $FeSO_4.7H_2O$ crystals;

hydrolyzing the second filtrate to form a third mixture;

filtering the third mixture to form a third filtrate and a third retained material, wherein the third retained material comprises the source of material of Ti; and calcinating at least a portion of the washed third retained material to form titanium dioxide ($TiO_2$).

\* \* \* \* \*